United States Patent [19]
Negami et al.

[11] Patent Number: 5,471,545
[45] Date of Patent: Nov. 28, 1995

[54] OPTICAL EXTERNAL MODULATOR FOR OPTICAL TELECOMMUNICATIONS

[75] Inventors: Shoichi Negami; Toshiya Hikami; Shigeaki Nishikawa; Matsue Murata, all of Tokyo, Japan

[73] Assignee: The Furukawa Electric Co., Ltd., Tokyo, Japan

[21] Appl. No.: 331,903

[22] Filed: Oct. 31, 1994

[30] Foreign Application Priority Data

Oct. 29, 1993 [JP] Japan .................... 5-294163
Oct. 29, 1993 [JP] Japan .................... 5-294165
Jun. 14, 1994 [JP] Japan .................... 6-155363

[51] Int. Cl.⁶ ........................................ G02F 1/01
[52] U.S. Cl. ................ 385/1; 385/2; 385/3; 385/11; 385/28; 385/31; 385/39
[58] Field of Search ........................ 385/1, 2, 3, 11, 385/27, 28, 31, 39, 49, 50, 51, 8, 9

[56] References Cited

U.S. PATENT DOCUMENTS

| | | | |
|---|---|---|---|
| 3,625,589 | 12/1971 | Snitzer | 385/11 X |
| 3,645,603 | 2/1972 | Smith | 385/1 X |
| 4,729,620 | 3/1988 | Pavlath | 385/11 X |
| 4,746,191 | 5/1988 | Kawakami et al. | 385/11 X |
| 4,768,851 | 9/1988 | Shaw et al. | 385/11 X |
| 4,801,189 | 1/1989 | Shaw et al. | 385/11 X |
| 4,872,738 | 10/1989 | Risk et al. | 385/1 X |
| 4,923,290 | 5/1990 | Brinkmeyer et al. | 385/11 X |
| 5,004,312 | 4/1991 | Shimizu | 385/1 X |
| 5,191,387 | 3/1993 | Ichikawa et al. | 385/1 X |
| 5,428,695 | 6/1995 | Ohta | 385/14 |

FOREIGN PATENT DOCUMENTS 5-040248  2/1993  Japan .................... 385/1 X

*Primary Examiner*—Brian Healy
*Attorney, Agent, or Firm*—Jacobson, Price, Holman & Stern

[57] ABSTRACT

There is provided an optical external modulator that can modulate the polarization of incident light without regulating the state of polarization of the light entering the modulator. Such a modulator can be suitably incorporated into an optical telecommunications system. An optical external modulator according to the invention comprises a substrate 1, an optical transmission line 7, a polarization modulating section 11 and a phase changing section 8 for changing the state of polarization of the light passing through the optical transmission line by applying stress to the optical transmission line 7 as a function of a modulation signal given to the modulator such that the phase difference between the X-component and the Y-component of the light being propagated through the optical transmission line 7 is shifted by $(2m-1)*\pi/2$ (m is a positive integer).

15 Claims, 25 Drawing Sheets

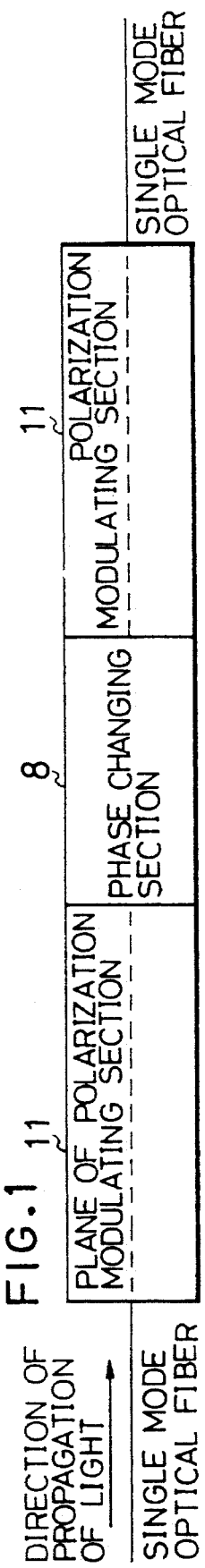
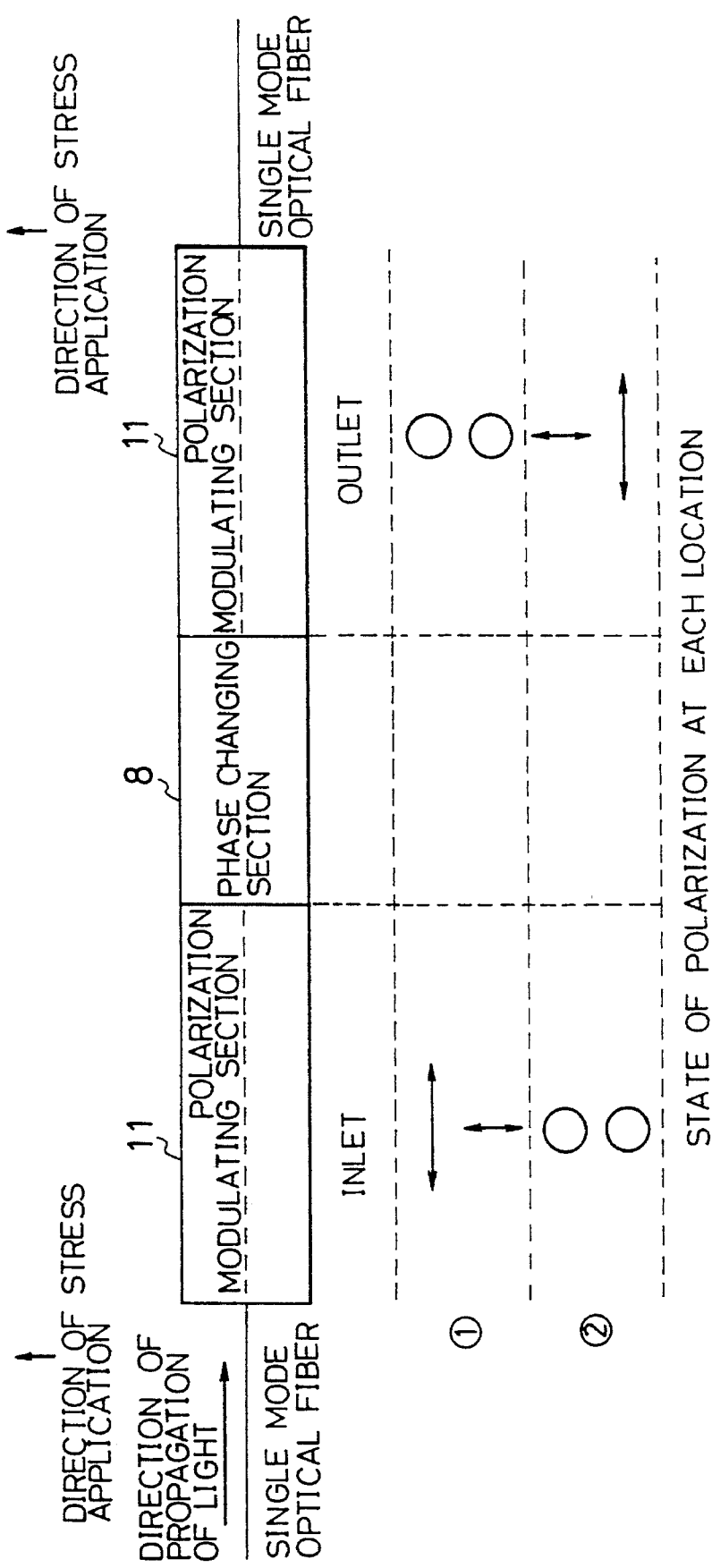

STATE OF POLARIZATION
AT EACH LOCATION 5,471,545

OPTICAL EXTERNAL MODULATOR FOR OPTICAL TELECOMMUNICATIONS

BACKGROUND OF THE INVENTION

1. Field of the Invention

This invention relates to an optical external modulator to be used for external modulation of the light being propagated through an optical transmission line of an optical telecommunications system.

2. Prior Art

Conventional optical modulators are mostly of the direct modulation type where the light emitted from a light source such as a semiconductor laser device or a light-emitting diode is modulated by directly modulating the electric current being fed to the light source. However, optical external modulators have recently been proposed to indirectly modulate the light being emitted from a source of continuous light and propagated through an optical transmission line (e.g., optical fiber) by externally applying signals to the light.

Japanese Patent Application No. 3-196291 teaches such an optical external modulator. Referring to FIG. 26(a) of the accompanying drawings, it comprises a lower electrode 2, a piezoelectric film 3 and an upper electrode 4 sequentially arranged in the described order on a side of a substrate 1 of quartz glass to produce a thin filmlike piezoelectric device 5 having a multilayer structure as well as lead wires 10a and 10b connected respectively to the lower and upper electrodes 2 and 4 in order to feed the piezoelectric film 3 with modulation signals and drive it to operate. For use, as illustrated in FIG. 26(b), a single mode optical fiber 17 is fitted to the :side oil the substrate opposite to the one where the electrodes 2 and 4 are arranged at a position directly below the piezoelectric film 3 and rigidly secured to the substrate 1 by means of a sheath 9 having a specific: acoustic impedance (the density of a medium to be used for the propagation of sound waves multiplied by the velocity at which the sound is propagated through tile medium) close to that of the clad of the optical fiber 17 in order to cover the latter for a desired distance. FIG. 27 shows another conventional optical external modulator. A single mode optical fiber 17 is arranged directly on the upper electrode 4 of the thin filmlike piezoelectric device 5 of tile modulator and rigidly secured to the substrate 1 by means of a sheath 9 having a specific acoustic impedance close to that of the clad of the optical fiber 17, lead wires 10a and 10b being respectively connected to the upper and lower electrodes 2 and 4 in order to feed the piezoelectric film 3 with modulation signals and drive it to operate.

With any of the above described optical external modulators, the piezoelectric film 3 periodically generates an elastic wave as a modulation signal having a predetermined frequency is applied to the appropriate one of the lead wires 10a and 10b from a drive power source and the stress given rise to by the wave is applied in turn to the single mode optical fiber 17 by way of the substrate 1 to produce a specific internal distribution pattern of refractivity variances within the optical fiber 17, which accordingly modifies the state of polarization of the light passing through the optical fiber 17.

The above described optical external modulators are of the so-called optical fiber type where a modulator (comprising a substrate 1 and a thin filmlike piezoelectric device 5) is combined with a single mode optical fiber to form a unit and hence not accompanied by any insertion loss that may become existent if the single mode optical fiber is connected to the modulator at a later stage.

The performance of such an optical external modulator can be determined by means of a gauging system as illustrated in FIG. 28. Light emitted from a light source such as a laser diode (LD) is made to pass through a polarizer designed to optimize the state of polarization of the incoming light and then introduced into an optical external modulator 33. A modulation signal having a predetermined frequency is applied to the optical external modulator 33 from a drive power source 34 in order to modify the state of polarization of the light being propagated through the single mode optical fiber in terms of the polarization. The mode of modulation of the light is then converted to that of intensity by an optical analyzer 35 and the light is thereafter converted into an electric signal by means of an O/E (opto-electric) converter 36. The electric signal is then observed by means of a spectrum analyzer 39 and an oscilloscope 37 to determine the performance of the optical modulator.

Problems to be Solved by the Invention

External optical modulators of the above described type, however, have major drawbacks. Firstly, the incident light cannot be modulated for the polarization at all if the incident light has the axis of polarization that is parallel or vertical to the direction along which stress is applied to the optical fiber, although optical external modulators are perpetually subjected to changes in the state of polarization of the incident light in actual optical telecommunications systems. Therefore, a conventional optical external modulator 33 has to be used in combination with a polarizer 32 arranged immediately upstream to the modulator in order to regulate the state of polarization of the incident light in such a way that the axis of polarization of the incident light may never become horizontal nor vertical to the direction along which stress is applied to the optical fiber. However, such an arrangement for constantly regulating the state of polarization of the incident light for an optical external modulator inevitably involves a large system whose cost will be inhibitive. Thus, the polarization dependency of existing optical external modulators provides a grave problem to be solved if they are used for practical applications.

It is, therefore, an object of the present invention to solve the above identified problems and other problems by providing an optical external modulator that can effectively modulate the incident light in terms of the polarization without requiring a process of regulating the state of polarization of the light incident to the modulator.

SUMMARY OF THE INVENTION

According to a first aspect of the invention, the above object is achieved by providing an optical external modulator having a configuration as illustrated in FIGS. 1 through 22 and comprising a polarization modulating section 11 for changing the state of polarization of the light being propagated through an optical transmission line 7 by applying a stress to the optical transmission line 7 as a function of a modulation signal given thereto and a phase changing section 8 for changing the phase difference between the X-component and the Y-component of the light being propagated through the optical transmission line 7 by $(2m-1)*\pi/2$ (m is a positive integer).

According to a second aspect of the invention, there is provided an optical external modulator having a configuration as illustrated in FIGS. 5 through 8 and comprising as an integral part-thereof an optical transmission line 7 having a slit 37 formed therein and a phase changing section 8 inserted into and rigidly secured to the slit 37 for changing the phase difference between the X-component and the Y-component of the light being propagated through the optical transmission line 7 by $(2m-1)*\pi/2$ (m is a positive integer).

According to a third aspect of the invention, there is provided an optical external modulator having a configuration as illustrated in FIGS. 18 and 19 and comprising a polarization modulating section 11 for changing the state of polarization of the light being propagated through a pair of optical transmission lines 7, 7 arranged as an integral part thereof by applying a stress to the optical transmission lines 7, 7 as a function of a modulation signal given thereto and a phase changing section 8 arranged between the pair of optical transmission lines 7, 7 for changing the phase difference between the X-component and the Y-component of the light being propagated through the optical transmission lines 7, 7 by $(2m-1)*\pi/2$ (m is a positive integer).

According to a fourth aspect of the invention, there is provided an optical external modulator having a configuration as illustrated in FIGS. 16 and 17 and comprising a pair of polarization modulating sections 11 for changing the state of polarization of the light being propagated through respective optical transmission lines 7, 7 arranged respectively as integral parts thereof by applying a stress to the optical transmission lines 7, 7 as a function of a modulation signal given thereto and a phase changing section 8 arranged between the pair of optical transmission lines 7, 7 for changing the phase difference between the X-component and the Y,component of the light being propagated through the optical transmission lines 7, 7 by $(2m-1)*\pi/2$ (m is a positive integer).

According to a fifth aspect of the invention, there is provided an optical external modulator comprising a polarization modulating section 11 having a configuration as illustrated in FIG. 4 and including a bulk type piezoelectric device 60 formed by arranging lower and upper electrodes on a piezoelectric substrate and an optical transmission line 7 arranged on a side of the bulk type piezoelectric device 60 such that the state of polarization of the light being propagated through tile optical transmission line 7 is changed by driving the piezoelectric substrate and applying a stress to the optical transmission line 7 as a function of a modulation signal given thereto.

According to a sixth aspect of the invention, there is provided an optical external modulator comprising a polarization modulating section 11 having a configuration as illustrated in FIGS. 5 through 9 and including an lower electrode 2, a piezoelectric film 3 and an upper electrode 4 sequentially arranged on the top or bottom side of a substrate 1 to produce a thin filmlike piezoelectric device 5 having a multilayer structure and an optical transmission line arranged on the top or bottom side of the substrate 1 and above or below said thin filmlike piezoelectric device 5 such that the skate of polarization of the light being propagated through the optical transmission line 7 is changed by driving the piezoelectric substrate and applying a stress to the optical transmission line 7 as a function of a modulation signal given to the appropriate one of the electrodes 2 and 4.

According to a seventh aspect of the invention, an optical external modulator as defined above in connection with the sixth aspect of the invention may alternatively comprise a pair of thin filmlike piezoelectric devices 5, 5 having a configuration as illustrated in FIG. 11 and arranged on a common substrate 1, a pair of optical transmission lines 7, 7 arranged on or under and rigidly secured to the respective thin filmlike piezoelectric devices 5, 5 and a phase changing section 8 disposed between the optical transmission lines 7, 7 for changing the phase difference between the X-component and the Y-component of the light being propagated through the optical transmission lines 7, 7 by $(2m-1)*\pi/2$ (m is a positive integer).

According to an eighth aspect of the invention, an optical external modulator as defined above in connection with the sixth aspect of the invention may alternatively comprise a pair of thin filmlike piezoelectric devices 5, 5 having a configuration as illustrated in FIGS. 11, 12, 16 and 17 and arranged on respective substrates 1, 1, a pair of optical transmission lines 7, 7 arranged on or under and rigidly secured to the respective thin filmlike piezoelectric devices 5, 5 and a phase changing section 8 disposed between the optical transmission lines 7, 7 for changing the phase difference between the X-component and the Y-component of the light being propagated through the optical transmission lines 7, 7 by $(2m-1)*\pi/2$ (m is a positive integer).

According to a ninth aspect of the invention, the phase changing section 8 of an optical external modulator as defined above in connection with one of the first through eighth aspects of the invention specifically comprises a quarter-wavelength plate 28, the principal axis of said quarter-wavelength plate 28 being held angularly relative to the direction of application of stress to the optical transmission line 7 by the thin filmlike piezoelectric device 5 to form an angle of 45 degrees.

According to a tenth aspect of the invention, the phase changing section 8 of an optical external modulator as defined above in connection with one of the first through eighth aspects of the invention specifically comprises an anisotropic optical waveguide 18 having a configuration as illustrated in FIGS. 11 through 19, the principal axis of said anisotropic optical waveguide 18 being held angularly relative to the direction of application of stress to the optical transmission line 7 by the thin filmlike piezoelectric device 5 to form an angle of 45', the length of said anisotropic optical waveguide 18 being so selected as to change the phase difference between the X-component and the Y-component of the light being propagated therethrough by $(2m-1)*\pi/2$ (m is a positive integer).

According to an eleventh aspect of the invention, the phase changing section 8 of an optical external modulator as defined above in connection with one of the first through eighth aspects of the invention specifically comprises a polarization maintaining optical fiber 38 having a configuration as illustrated in FIGS. 14 through 19, the principal axis of said polarization maintaining optical fiber 38 being held angularly relative to the direction of application of stress to the optical transmission line 7 to form an angle of 45 degrees, the length of said polarization maintaining optical fiber 38 being so selected as to change the phase difference between the X-component and the Y-component of the light being held therein by $(2m-1)*\pi/2$ (m is a positive integer).

According to a twelfth aspect of the invention, the phase changing section 8 of an optical external modulator as defined above in connection with one of the first through eighth aspects of the invention specifically comprises a pair of electrodes 70 having a configuration as illustrated in FIG. 18 and arranged at opposite sides of the optical transmission line 7, the length of said electrodes 70 being so selected as to change the phase difference between the X-component and the Y-component of the light being held therein by $(2m-1)*\pi/2$ (m is a positive integer).

According to a thirteenth aspect of the invention, the phase changing section 8 of an optical external modulator as defined above in connection with one of the first through eighth aspects of the invention specifically comprises a single mode optical fiber 48 having a looped configuration as illustrated in FIGS. 20 through 22, radius of curvature of said single mode optical fiber 48 being so selected as to change the phase difference between the X-component and the Y-component of the light being propagated therethrough by $(2m-1)*\pi/2$ (m is a positive integer).

According to a fourteenth aspect of the invention, the optical transmission line 7 of an optical external modulator as defined above in connection with one of the first through thirteenth aspects of the invention specifically comprises a single mode optical fiber 17 as illustrated in FIGS. 5 through 9, 12 and 16 through 19.

According to a fifteenth aspect of the invention, the optical transmission line 7 of an optical external modulator as defined above in connection with one of the first through thirteenth aspects of the invention specifically comprises an optical waveguide 27 as illustrated in FIGS. 3, 4, 10, 11 and 13 through 15.

Operation

An optical external modulator according to the invention operates in a manner as described below by referring to FIG. 2 conceptually illustrating some of the functional features of the modulator. Note that the modulator illustrated in FIG. 2 comprises an phase changing section 8 arranged between a pair of optical transmission lines 7, 7 comprised in respective polarization modulating sections 11, 11 in order to change the phase difference between the X-component and the Y-component of the light being propagated therethrough by $(2m-1)*\pi/2$ (m is a positive integer).

Referring to FIG. 2, if light introduced into the optical transmission line 7 of the upstream one of the polarization modulating sections 11, 11 is linearly polarized and the axis of polarization is parallel or vertical to the direction along which stress is applied to the optical transmission line as indicated by (1) in FIG. 2, the light comes to show circular polarization after passing the phase changing section 8 that shifts the phase difference between the X-component and the Y-component of the light being propagated therethrough by $(2m-1)*\pi/2$ (m is a positive integer) and before entering the optical transmission line 7 of the downstream one of the polarization modulating sections 11, 11.

If, on the other hand, light introduced into the optical transmission line 7 of the upstream one (left one in FIG. 2) of the polarization modulating sections 11, 11 has circular polarization, it comes to show a phase difference of $(2m-1)*\pi/2$ (m is a positive integer) and linear polarization with the axis of polarization running parallel with or vertically to the direction along which stress is applied to the optical transmission line 7 while being propagated through the phase changing section 8 before entering the optical transmission line 7 of the downstream one of the polarization modulating sections 11, 11.

In any other cases, the state of polarization of light in the upstream one and that in the downstream one of the polarization modulating sections 11, 11 will be linear with the axis of polarization not parallel with or vertical to the direction along which stress is applied to the optical transmission line and elliptical polarization respectively or vice versa.

Of all possible statues of polarization, those that are free from modulation of the of polarization are linearly polarized ones with the axis of polarization running in parallel with or vertically to the direction along which stress is applied to the optical transmission line 7. However, with an optical external modulator according to the invention, light introduced into it would never fall into a state of polarization where light is linearly polarized with the axis of polarization running in parallel with or vertically to the direction along which stress is applied to the optical transmission line 7 in both of the plane of polarization modulating sections 11, 11 at the same time. Thus, light passing through the optical external modulator is unfailingly modulated for its polarization either in the upstream one or in the downstream one of the optical transmission lines 7, 7 that are arranged before and after the phase changing section 8 respectively so that the incident light can be effectively and efficiently modulated for its of polarization without requiring a process of regulating the state of polarization of the light incident to the modulator. In other words, an optical external modulator according to the invention is independent of the state of polarization of the light incident to the modulator.

Now, the present invention will be described in greater detail by way of preferred embodiments of the invention illustrated in the accompanying drawings.

BRIEF DESCRIPTION OF THE DRAWINGS

FIG. 1 is a schematic illustration, showing the basic configuration of an optical external modulator according to the invention.

FIG. 2 is a schematic view similar to FIG. 1, additionally illustrating some of the functional features of the optical external modulator.

DETAILED DESCRIPTION OF THE PREFERRED EMBODIMENTS

Embodiment 1

Figure 3A:
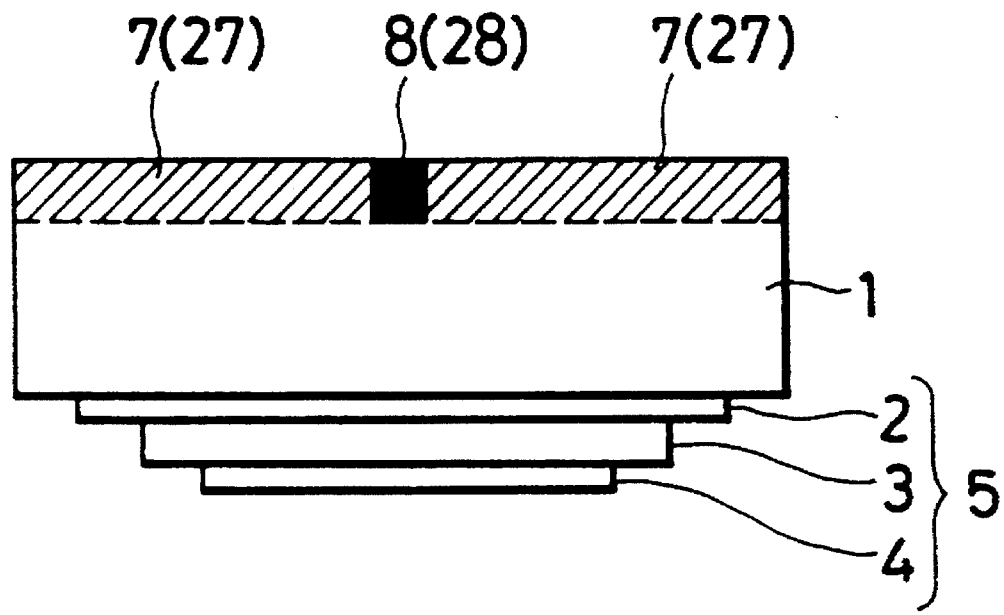
FIG. 3 shows in two different views a preferred embodiment of optical external modulator according to the invention and comprising an optical waveguide as an optical transmission line, a thin filmlike piezoelectric device as stress application means and a quarter-wavelength plate as optical modulation means, wherein (a) represents a side view and (b) represents a plan view.
Figure 3B:
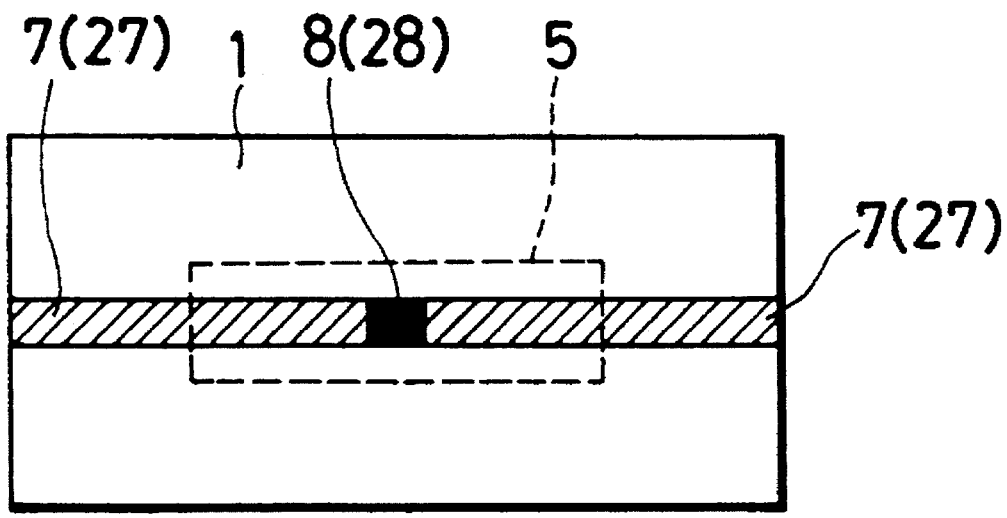

A first embodiment of optical external modulator according to the invention will be described by referring to FIG. 3. The optical external modulator of FIG. 3 comprises a square quartz glass substrate 1 that is approximately 1 mm thick and 20 mm wide, a thin filmlike piezoelectric device 5 arranged on a surface of the substrate 1, an optical waveguide 27 that is approximately 10 μm wide and 5 μm thick and arranged on the opposite surface of the substrate 1 and a quarter-wavelength plate 28 for producing a phase difference of $(2m-1)*\pi/2$ (m is a positive integer) between the two components of light being propagated through the optical waveguide 27, said quarter-wavelength plate 28 being received in a slit 27 formed on an appropriate position (between regions 7a and 7b) of the optical waveguide 27 and rigidly bonded to the substrate 1 by means of an optical adhesive agent in such a manner that its principal axis is inclined by 45 degrees from the direction along which stress is applied to the optical waveguide 27.

Note that the substrate 1 may alternatively be made of silicon or sapphire. Said quarter-wavelength plate 28 is typically about 45 m wide and made of rock crystal.

If quartz glass is used for the substrate 1, the optical waveguide 27 is formed by depositing fine particles of $SiO_2$—$B_2O_3$—$GeO_2$ type glass on the quartz glass by means of CVD and transforming the deposi into a layer of transparent glass. The optical waveguide 27 may alternatively be realized in the form of a dielectric thin film made of a polymeric material such as PMMA Or photopolymer by using the technique of spin coating or dip coating. Still alternatively, it may be formed to a thin film of a glassy waveguide material such as Coning 7059 by means of RF sputtering.

If, on the other hand, the substrate 1 is made of silicon, the optical waveguide 27 cannot suitably be formed to a thin film by directly depositing silicon on the substrate as in the case of a quartz glass substrate because of the large refractive index of silicon. For an optical waveguide to be formed on a silicon substrate 1, the surface of the silicon substrate 1 has to be thermally oxidized to produce an $SiO_2$ layer to a thickness greater than 5 μm. Then, an optical waveguide 27 can be successfully formed on the $SiO_2$ layer by using any technique as referred to above with regard to a quartz glass substrate.

The thin filmlike piezoelectric device 5 is realized by sequentially laying a lower electrode 2, a piezoelectric film 3 and an upper electrode 4 in the mentioned order and designed to generate stress, which is by turn applied to light being propagated through the optical waveguide 3.

The upper electrode 4 of the thin filmlike piezoelectric device 5 is a rectangular thin layer of gold (Au) typically formed by vacuum deposition to a thickness of about 0.5 μm and a surface area appropriate to the frequency band to be used and disposed right under the optical waveguide 27 along its longitudinal direction (the direction along which light is propagated). The upper electrode 4 may alternatively be made of an alloy of chromium and gold (Cr—Au) or aluminum (Al).

The piezoelectric film 3 of the thin filmlike piezoelectric device 5 is typically a layer of zinc oxide (ZnO) formed by sputtering to a thickness of about 10 μm, although the piezoelectric film 3 may alternatively be made of a material selected from piezoelectric substances including lithium niobate ($LiNbO_3$), polyvinyliden fluoride (PVDF) and aluminum nitride (AlN).

The lower electrode 4 of the thin filmlike piezoelectric device 5 is a thin layer of aluminum typically formed by vacuum deposition to a thickness of about 0.3 μm, although the lower electrode 4 may alternatively be made of a titanium-gold (Ti—Au) or chromium-gold (Cr—Au) alloy.

Embodiment 2

Figure 4A:
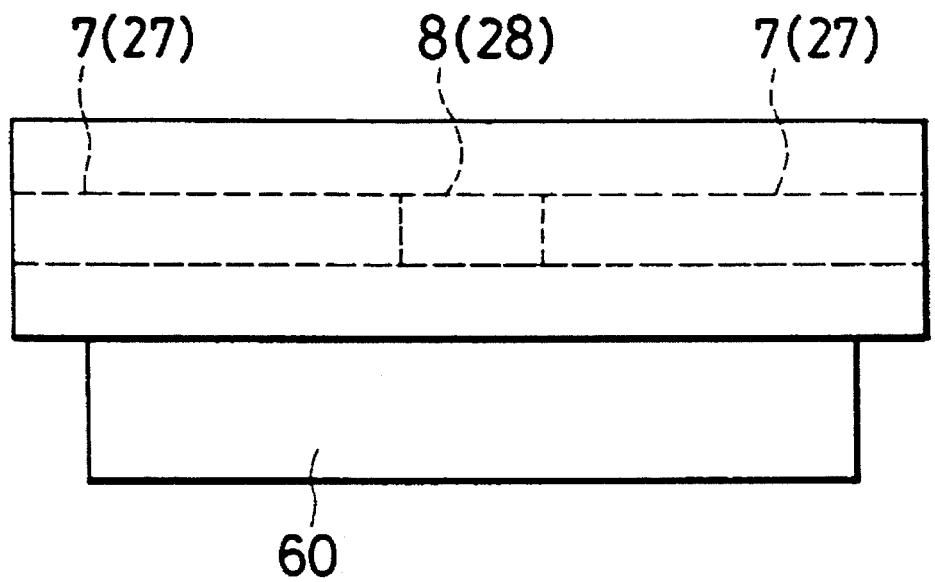
FIG. 4 shows in two different views another preferred embodiment of optical external modulator according to the invention and comprising an optical waveguide as an optical transmission line, a bulk type piezoelectric device as stress application means and a quarter-wavelength plate as optical modulation means, wherein (a) represents a side view and (b) represents a plan view.
Figure 4B:
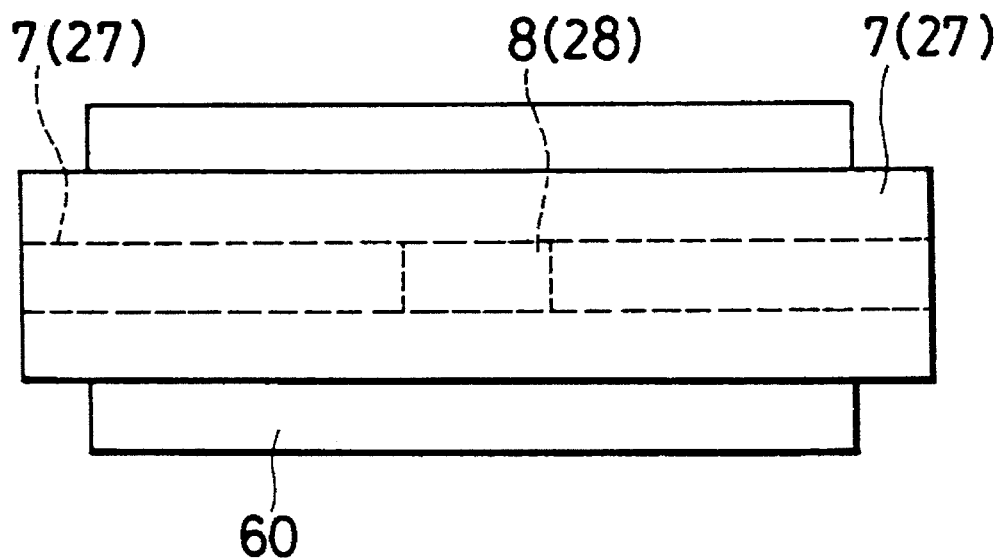

FIG. 4 shows a second embodiment of optical external modulator according to the invention. The basic configuration of the embodiment is similar to that of he embodiment of FIG. 3, although the thin filmlike piezoelectric device of the modulator of FIG. 3 is replaced by a bulk type piezoelectric device 60 in this embodiment. The bulk type piezoelectric device typically comprises an about 1 mm thick piece of a piezoelectric ceramic material such as PZT and a lower electrode and an upper electrode arranged on the opposite surfaces of the piezoelectric piece. An optical waveguide 12 is arranged as an optical transmission line 7 on a surface of the bulk type piezoelectric device 60 to form a polarization modulating section 11, by which, as a modulation signal is applied to the upper and lower electrodes to dive the piezoelectric device and generate stress therein, the generated stress is applied to the optical waveguide 12 to change the state of polarization of light as a function of the modulation signal.

Embodiment 3

Figure 5A:
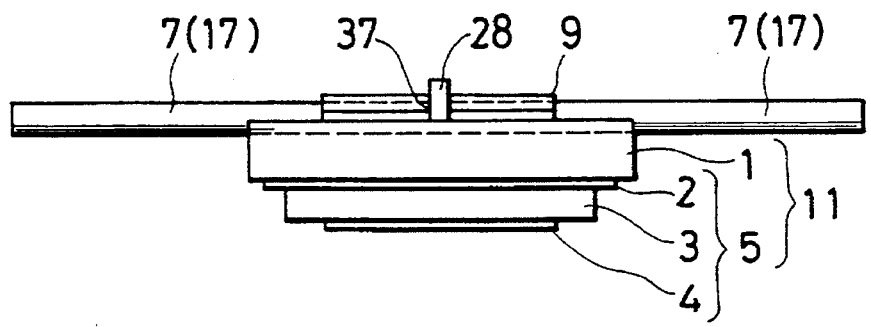
FIG. 5 shows in two different views still another preferred embodiment of optical external modulator according to the invention and comprising a single mode optical fiber as an optical transmission line, a thin filmlike piezoelectric device as stress application means and a quarter-wavelength plate as optical modulation means, an arcuate groove being provided for receiving the optical fiber, wherein (a) represents a side view and (b) represents a front view.
Figure 5B:
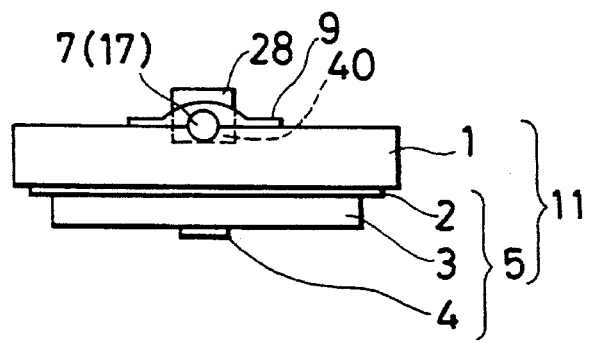

FIG. 5 shows a third embodiment of optical external modulator according to the invention. The basic configuration of the embodiment is similar to that of the embodiment of FIG. 3 and this embodiment differs from the first embodiment only in that a single mode optical fiber 17 is used as an optical transmission line. The single mode optical fiber 17 is arranged in a receiving groove 40 on the upper surface of substrate 1 as shown in (a) of FIG. 5, covered by a sheath 9 formed by burning granulous quartz glass (and having a specific acoustic impedance close to that of the clad of the single mode optical fiber (17) and acoustically secured to the substrate 1. After securing the single mode optical fiber 17, a slit 37 is formed in the optical fiber and a quarter-wavelength plate 28 is inserted into the slit 37 and rigidly bonded to the substrate 1 by means of an optical adhesive agent to produce a phase changing section 8.

Embodiment 4

Figure 6A:
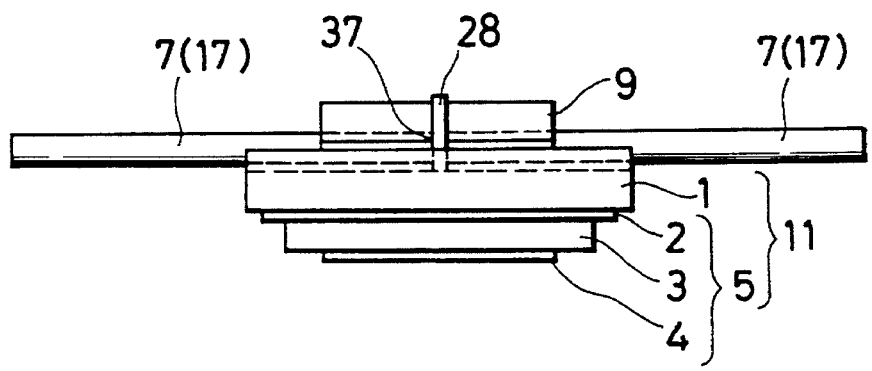
FIG. 6 shows in two different views still another preferred embodiment of optical external modulator according to the invention and comprising a single mode optical fiber as an optical transmission line, a thin filmlike piezoelectric device as stress application means and a quarter-wavelength plate as optical modulation means, a V-shaped groove being provided for receiving the optical fiber, wherein (a) represents a side view and (b) represents a front view.
Figure 6B:
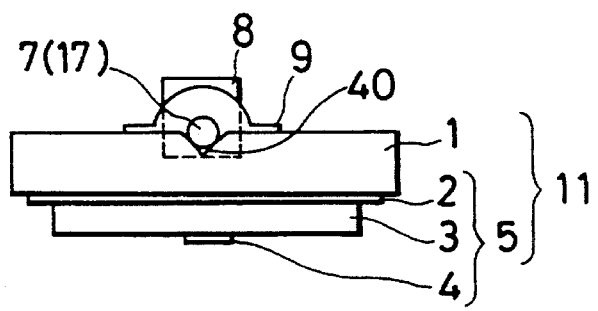

FIG. 6 shows a fourth embodiment of optical external modulator according to the invention. The basic configuration of the embodiment is similar to that of the embodiment of FIG. 5 and this embodiment differs from the third embodiment only in that the receiving groove 40 formed in the substrate 1 has a V-shaped cross section. In this embodiment again, the gap between the receiving groove 40 of the substrate 1 and the single mode optical fiber 17 is filled with a sheath 9 formed by burning granulous quartz glass so that the optical fiber 17 is acoustically bonded to the substrate 1.

Embodiment 5

Figure 7A:
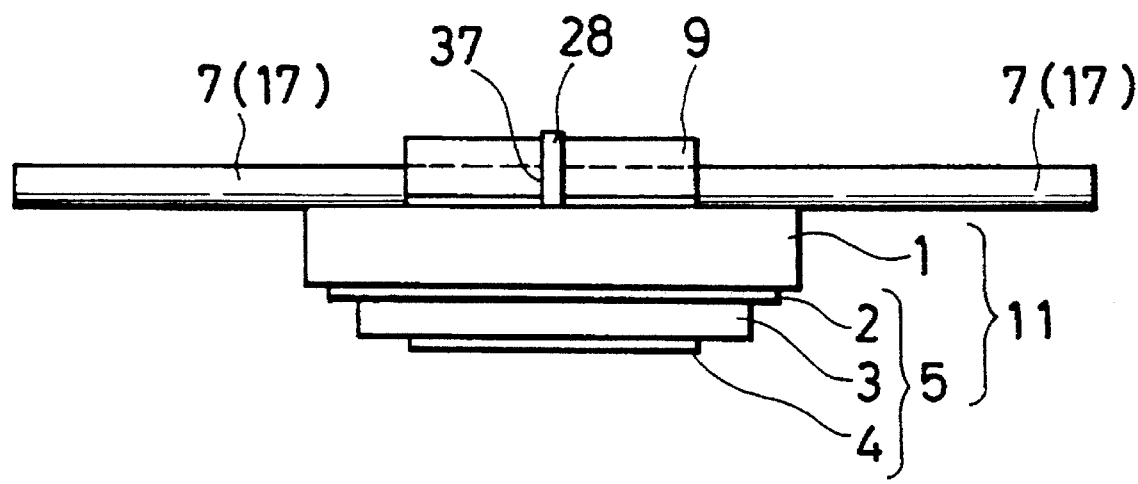
FIG. 7 shows in two different views still another preferred embodiment of optical external modulator according to the invention and comprising a single mode optical fiber as an optical transmission line, a thin filmlike piezoelectric device as stress application means and a quarter-wavelength plate as optical modulation means, the optical fiber being disposed on a flat surface of the substrate 1 of the modulator, wherein (a) represents a side view and (b) represents a front view.
Figure 7B:
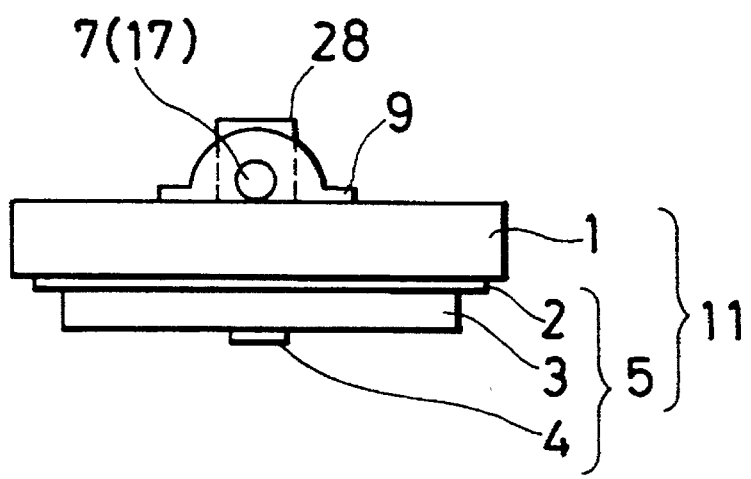

FIG. 7 shows a fifth embodiment of optical external modulator according to the invention. The basic configuration of the embodiment is similar to that of the embodiments of FIGS. 9 and 6 and this embodiment differs from those embodiments only in that a single mode optical fiber 17 is arranged on the substrate 1 without forming a groove in the substrate 1 for receiving the optical fiber 17. In this embodiment again, the single mode optical fiber 17 is covered by a sheath 9 formed by burning granulous quartz glass and acoustically connected to the substrate 1.

Embodiment 6

Figure 8A:
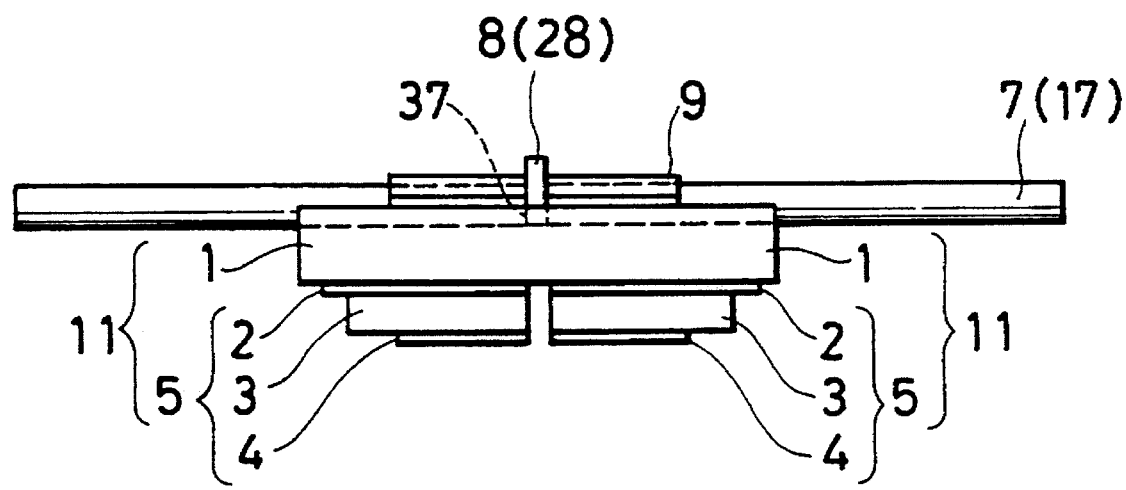
FIG. 8 shows in two different views still another preferred embodiment of optical external modulator according to the invention and comprising a single mode optical fiber as an optical transmission line, a thin filmlike piezoelectric device as stress application means and a quarter-wavelength plate as optical modulation means, the optical fiber being received in an arcuate groove, wherein (a) represents a side view and (b) represents a front view.
Figure 8B:
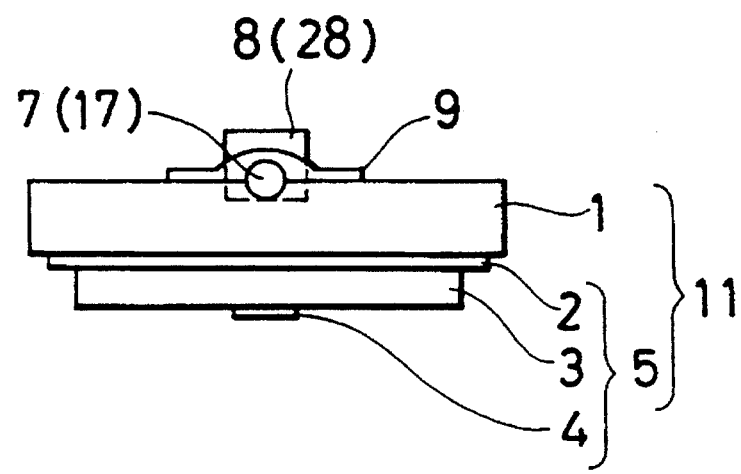

FIG. 8 shows a sixth embodiment of optical external modulator according to the invention. This embodiment comprises a substrate 1, a thin filmlike piezoelectric device 5 arranged on the substrate 1, a single mode optical fiber 17 arranged right on the thin filmlike piezoelectric device 5 (on the same side of the substrate), which is rigidly secured to the thin filmlike piezoelectric device 5 by means of a sheath 9, and a quarter-wavelength plate 28 inserted into a slit 37 which is cut into the single mode optical fiber 17 through the sheath 9 and bonded to the substrate 1 by means of an optical adhesive agent.

Embodiment 7

Figure 9A:
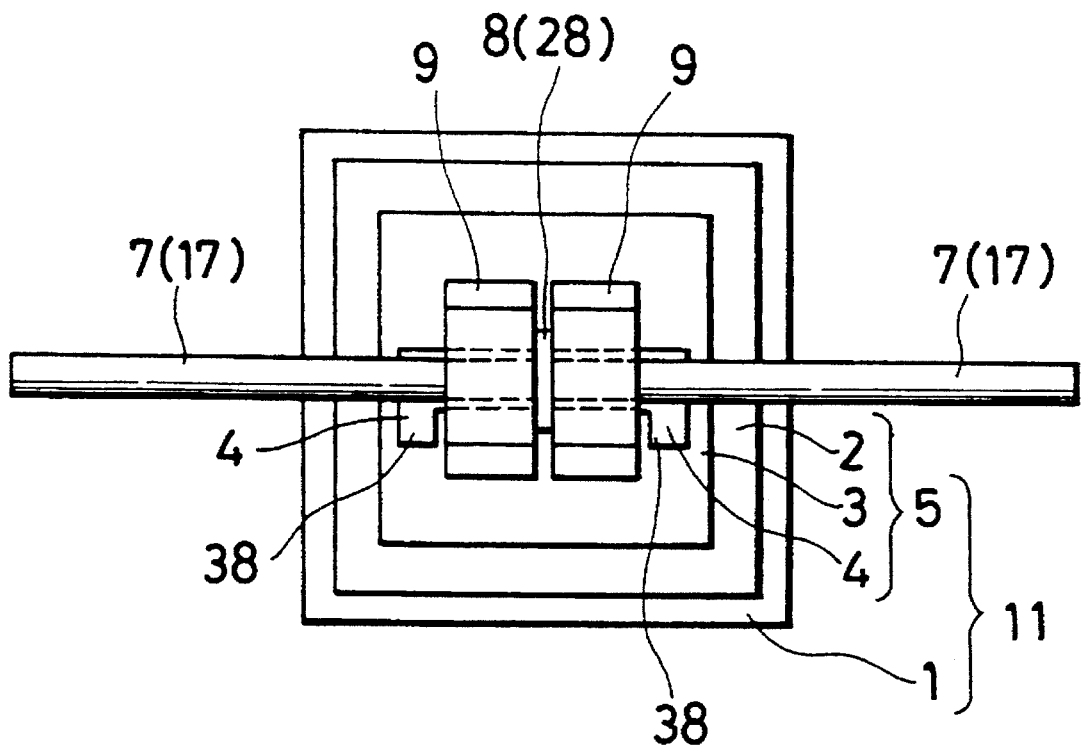
FIG. 9 shows in two different views still another preferred embodiment of optical external modulator according to the invention and comprising a single mode optical fiber as an optical transmission line, a thin filmlike piezoelectric device as stress application means and a quarter-wavelength plate as optical modulation means, the optical fiber being disposed on a flat surface of the substrate of the modulator, the sheath being provided in two pieces, wherein (a) represents a side view and (b) represents a front view.
Figure 9B:
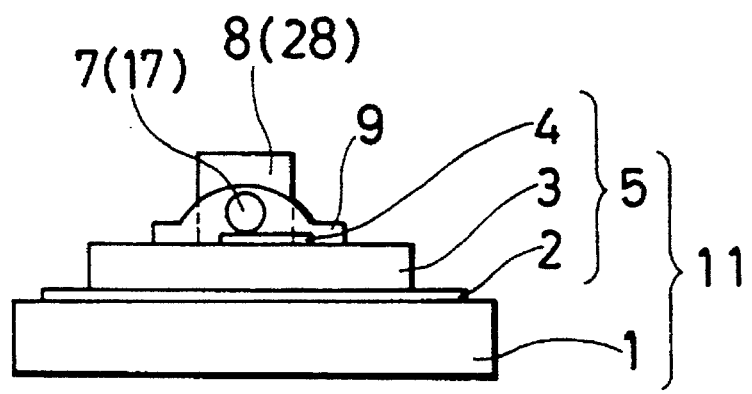
Figure 26A:
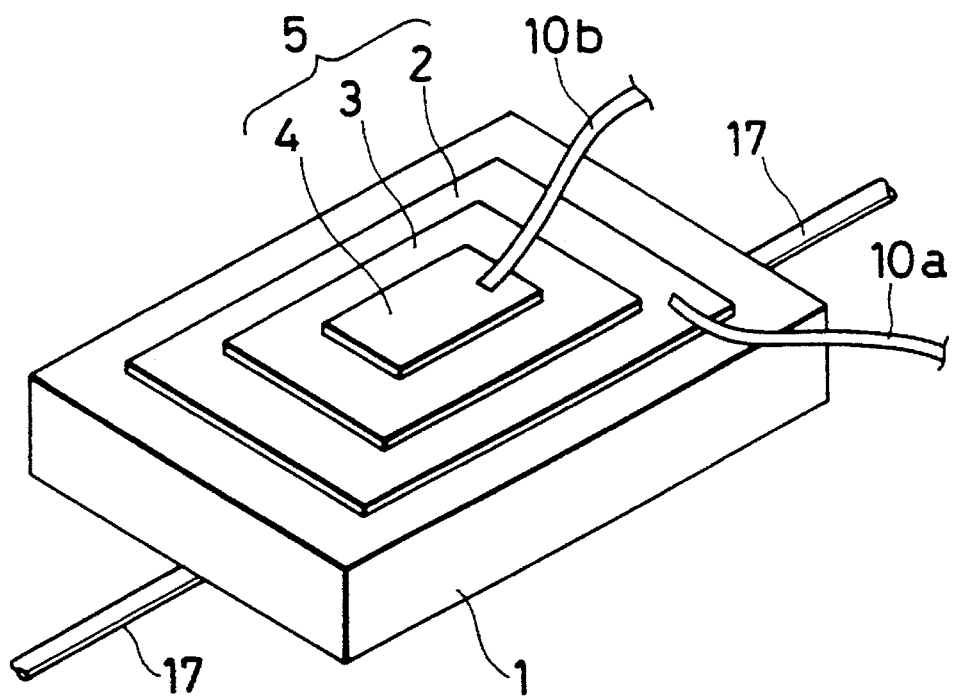
FIG. 26 shows in two different views a conventional optical external modulator, wherein (a) represents a schematic perspective view thereof as seen from the front side and (b) represents a schematic perspective view thereof as seen from the rear side.
Figure 26B:
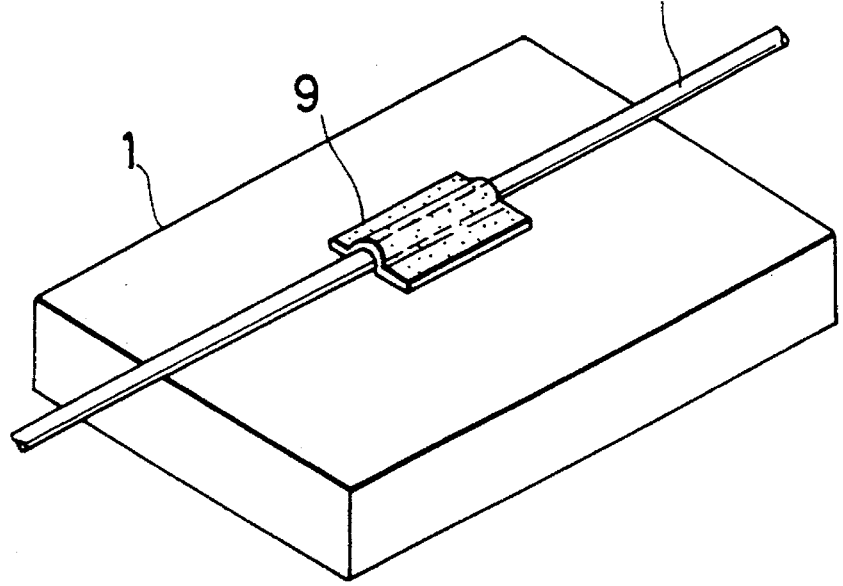
Figure 27:
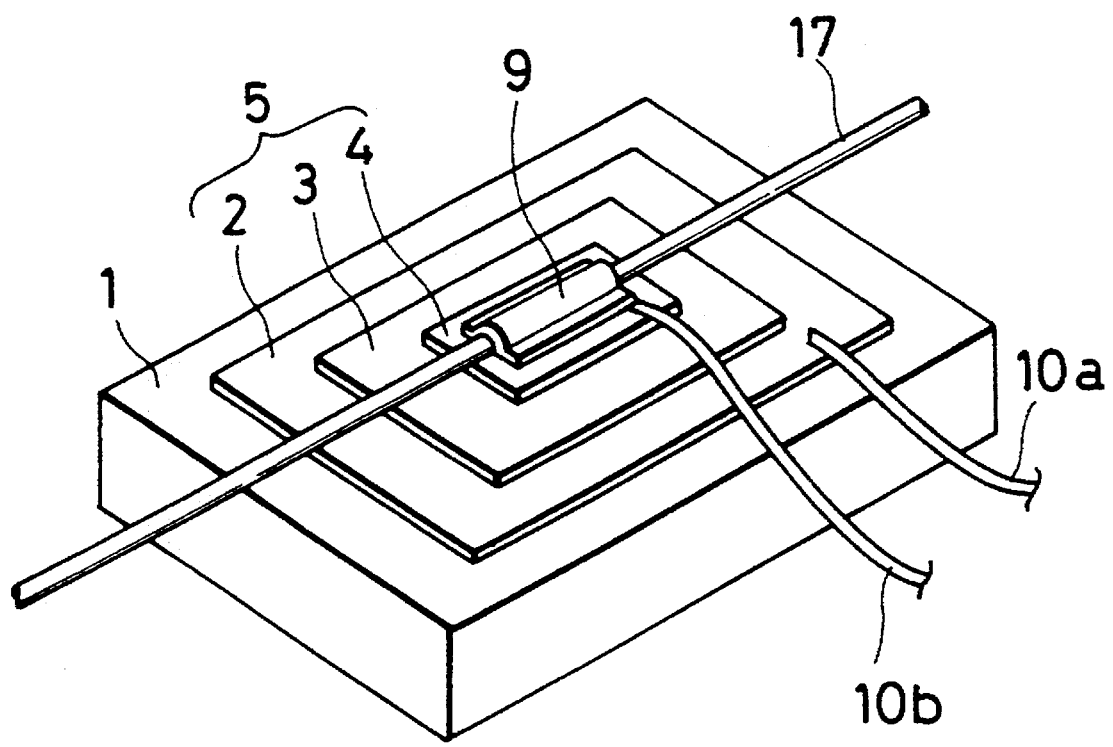
FIG. 27 is a schematic perspective view of another conventional optical external modulator.

FIG. 9 shows a seventh embodiment of optical external modulator according to the invention. The basic configuration of the embodiment is similar to that of the embodiments of FIGS. 5 through 8 and this embodiment differs from those embodiments only in that a single mode optical fiber 17 is arranged right on the upper electrode 4 of the thin filmlike piezoelectric device 5 and covered by a sheath 9 which is provided in two pieces and a quarter-wavelength plate 28 is inserted between and secured to the two component pieces of the sheath 9. Note that the upper electrode 4 is laterally extended at the longitudinal opposite extremities (along the single mode optical fiber 17) to produce a pair of auxiliary sections 38, 38 that are available for arranging lead wires as shown in (a) of FIG. 9 because, if such extended sections were not provided, the space available for arranging lead wires (10a, 10b in FIG. 26) that are used for feeding modulation signals to the modulator to drive the piezoelectric film 3 would become too scarce on the upper electrode 4 once a thin filmlike piezoelectric device 5 is arranged right on the upper electrode 4.

Embodiment 8

Figure 10A:
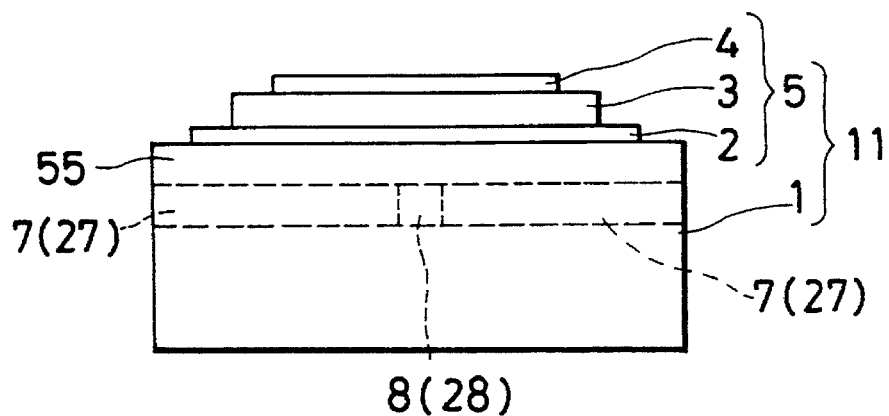
FIG. 10 shows in three different views still another preferred embodiment of optical external modulator according to the invention and comprising an optical waveguide as an optical transmission line, a thin filmlike piezoelectric device as stress application means and a quarter-wavelength plate as optical modulation means, the thin filmlike piezoelectric device being disposed on the optical waveguide, wherein (a) represents a side view, (b) represents a plan view and (c) represents a front view.
Figure 10B:
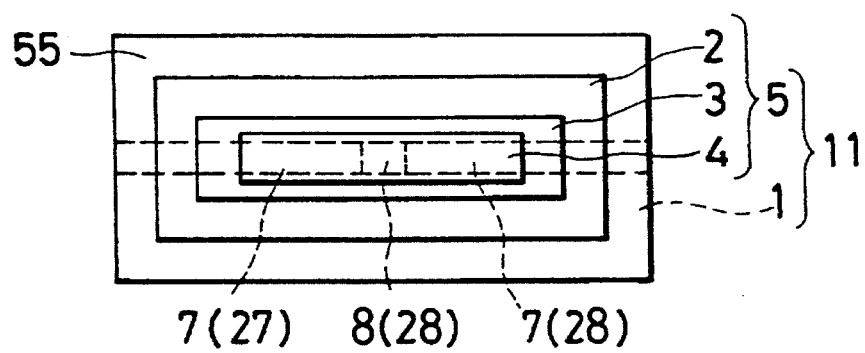
Figure 10C:
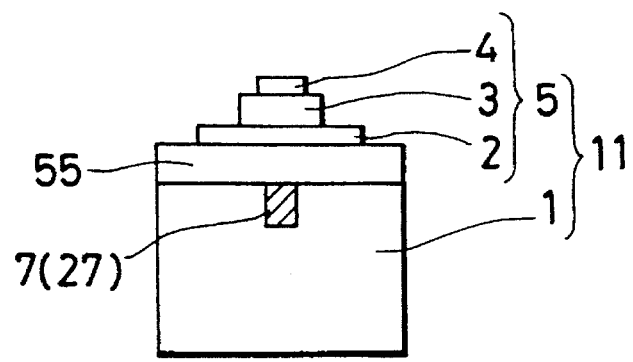

FIG. 10 shows an eighth embodiment of optical external modulator according to the invention. In this embodiment, an optical waveguide 27 arranged on a substrate 1 is used as an optical transmission line 7 and a dielectric film 55 is arranged thereon. A thin filmlike piezoelectric device 5 comprising a lower electrode 2, a piezoelectric film 3 and an upper electrode 4 is disposed on the dielectric film 55, which is designed to prevent light passing through the optical waveguide 27 from abating under the influence of the lower electrode 2. The dielectric film 55 is preferably made of $SiO_2$ and has a thickness greater than 5 μm.

Embodiment 9

Figure 11A:
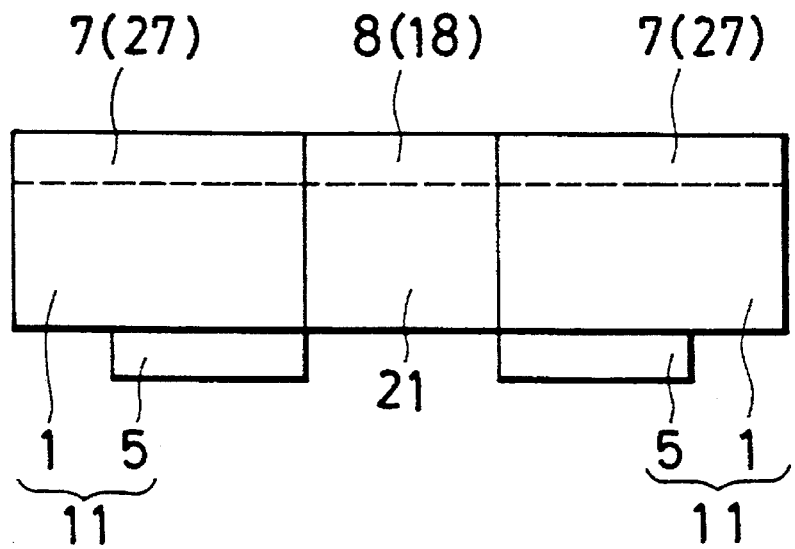
FIG. 11 shows in two different views still another preferred embodiment of optical external modulator according to the invention and comprising an optical waveguide as an optical transmission line, a thin filmlike piezoelectric device as stress application means and an anisotropic waveguide as optical modulation means, wherein (a) represents a side view and (b) represents a plan view.
Figure 11B:
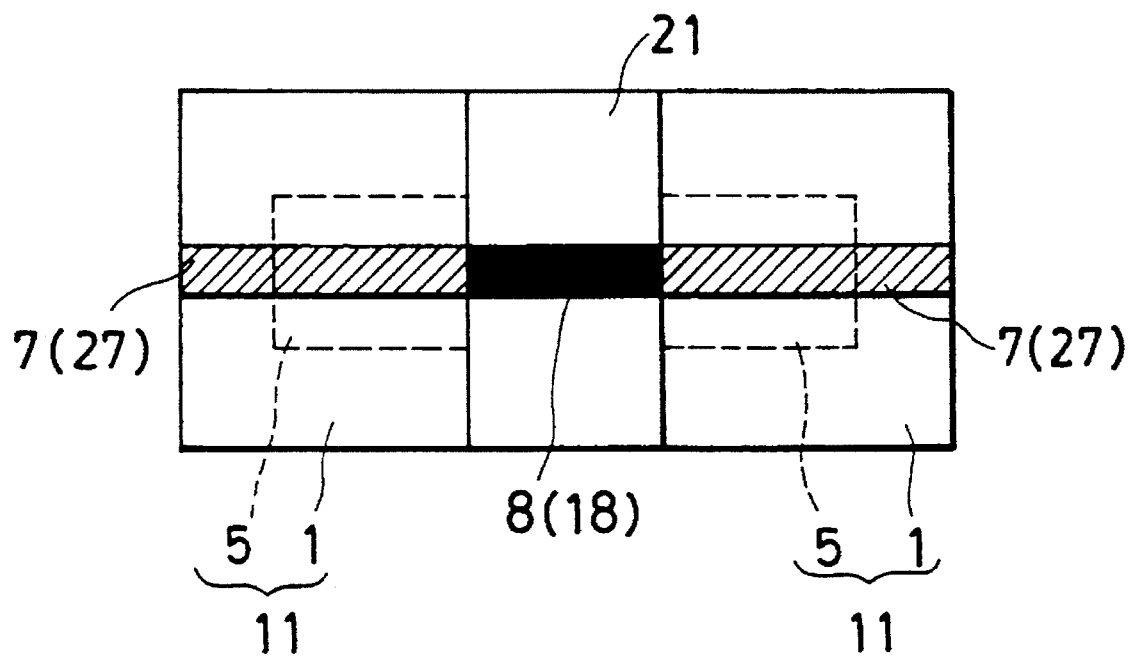

FIG. 11 shows a ninth embodiment of optical external modulator according to the invention. This embodiment comprises a pair of square quartz glass substrate 1 each of which is about 1 mm thick and 20 mm wide, a pair of thin filmlike piezoelectric devices 5, 5 respectively arranged on surfaces of the square quartz glass substrates 1 and a pair of optical waveguides 27, 27 which are about 10 μm wide and 5 μm thick and respectively arranged on the surfaces of the substrates 1, 1 opposite to the ones where the thin filmlike piezoelectric devices 5, 5 are arranged to produce a pair of polarization modulators 11, 11, between which an anisotropic waveguide 18 having a substrate 21 of lithium niobate ($LiNbO_3$) is inserted to produce a phase changing section 8.

The anisotropic waveguide 18 having a substrate 21 of lithium niobate ($LiNbO_3$) as described above can be prepared by thermally diffusing titanium (Ti) on the substrate 21 of lithium niobate ($LiNbO_3$). The length of the anisotropic waveguide 18 is defined by the formula shown below.

$$L=(2m-1)*(\lambda/4)/(\Delta n),$$

where m: a positive integer,

λ: the wavelength of light from the light source and

Δn: the difference in the refractive index in the anisotropic waveguide.

Embodiment 10

Figure 12A:
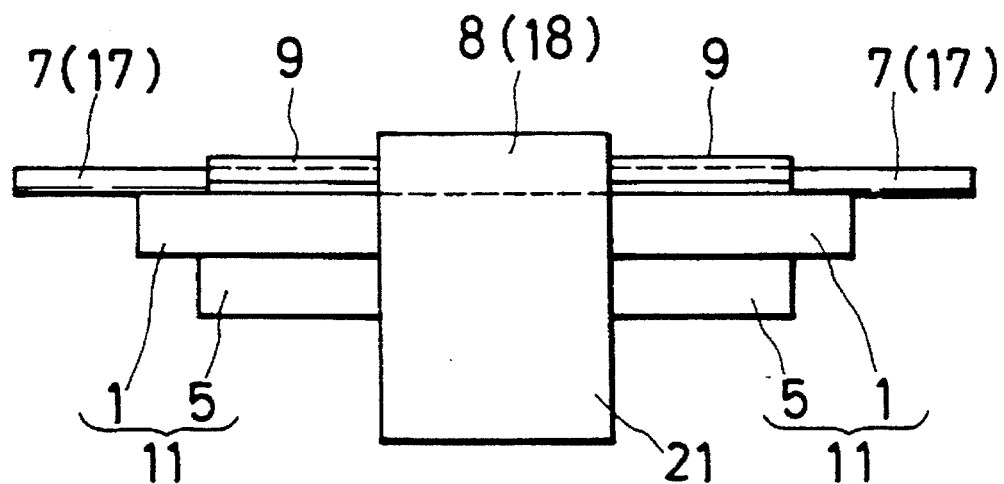
FIG. 12 shows in two different views still another preferred embodiment of optical external modulator according to the invention and comprising a single mode optical fiber as an optical transmission line, a thin filmlike piezoelectric device as stress application means and an anisotropic waveguide as optical modulation means, wherein (a) represents a side view and (b) represents a plan view.
Figure 12B:
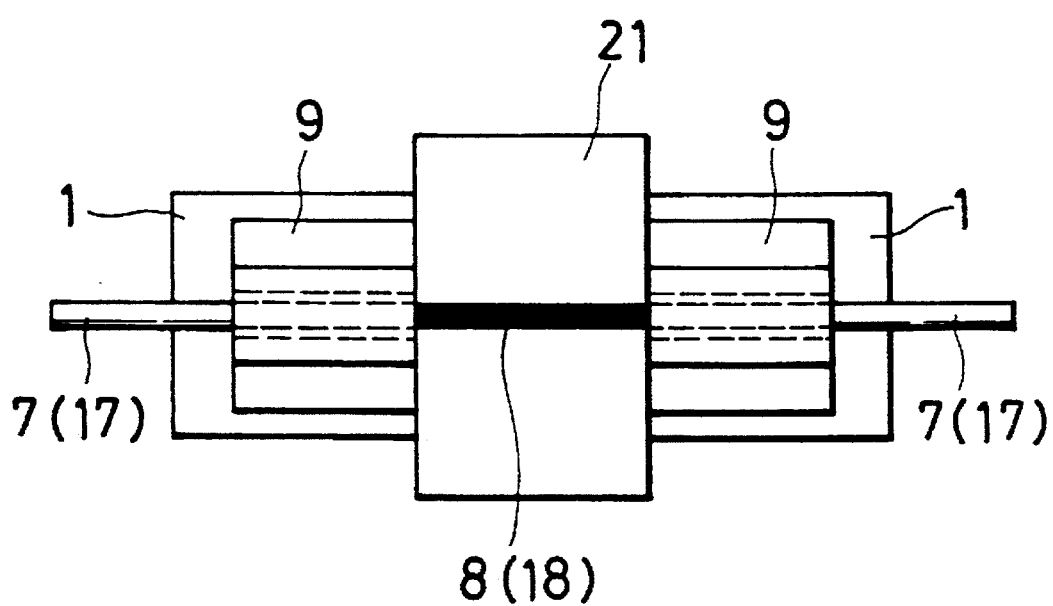

FIG. 12 shows a tenth embodiment of optical external modulator according to the invention. The basic configuration of the embodiment is similar to that of the embodiment of FIG. 11 and this embodiment differs from the ninth embodiment only in that a pair of single mode optical fibers 17, 17 are used as optical transmission lines 7, 7. The single mode optical fibers 17, 17 are arranged on a substrate 1 as illustrated in (b) of FIG. 12 and covered by respective sheaths 9, 9 formed by burning granulous quartz glass (and having a specific acoustic impedance close to that of the clad of the single mode optical fiber 17) and acoustically secured to the substrate 1.

Embodiment 11

Figure 13A:
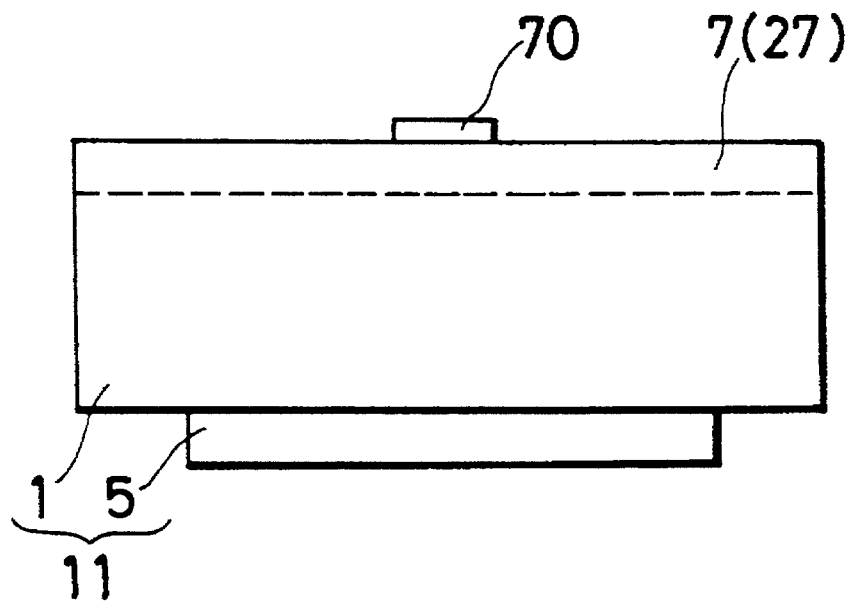
FIG. 13 shows in two different views still another preferred embodiment of optical external modulator according to the invention and comprising an optical waveguide as an optical transmission line, a thin filmlike piezoelectric device as stress application means and electrodes as optical modulation means, herein (a) represents a side view and (b) represents a plan view.
Figure 13B:
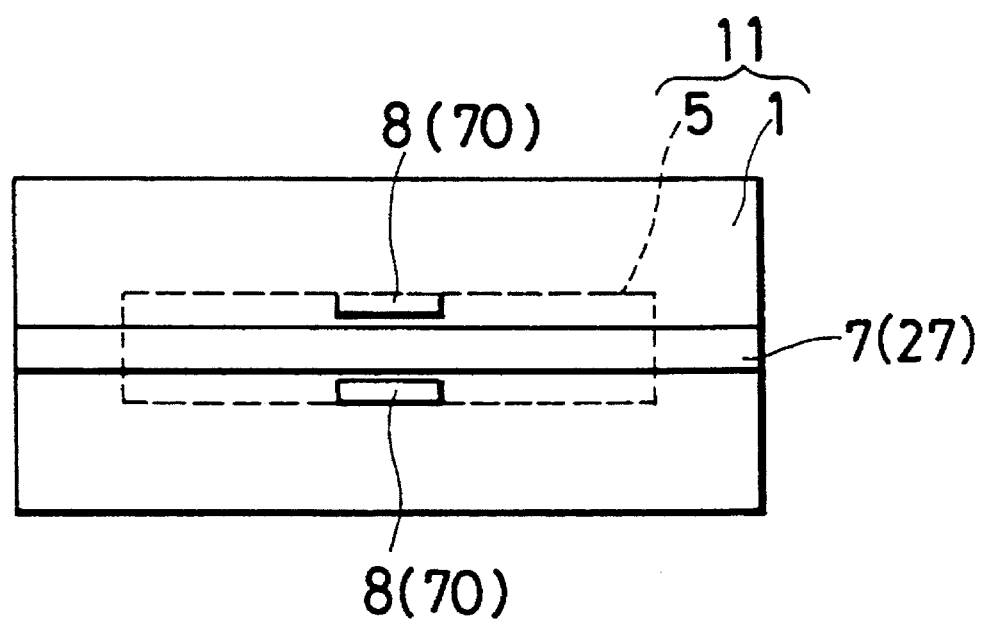

FIG. 13 shows an eleventh embodiment of optical external modulator according to the invention. This embodiment comprises a thin filmlike piezoelectric device 5 arranged on a surface of a square quartz glass substrate 1 which is about 1 mm thick and 20 mm wide, an optical waveguide 27 which is about 10 μm wide and 5 μm thick and arranged on the surface of the substrate 1 opposite to the one where the thin filmlike piezoelectric device 5 is arranged and a pair of electrodes 70, 70 arranged oppositely on the lateral sides of the optical waveguide 27.

The electrodes 70, 70 are designed to operate as phase changing sections 8, 8 and apply an electric field to the optical waveguide 27 to generate a certain distribution pattern of refractivity within the optical waveguide 27 when a voltage is applied to them. The length of each of the electrodes 70, 70 is defined by the formula shown below.

$$L=(2m-1)*(\lambda/4)/(\Delta n),$$

where m: a positive integer,

λ: the wavelength of light from the light source and

Δn: the difference in the refractive index generated in the optical waveguide by an electric field.

Embodiment 12

Figure 14A:
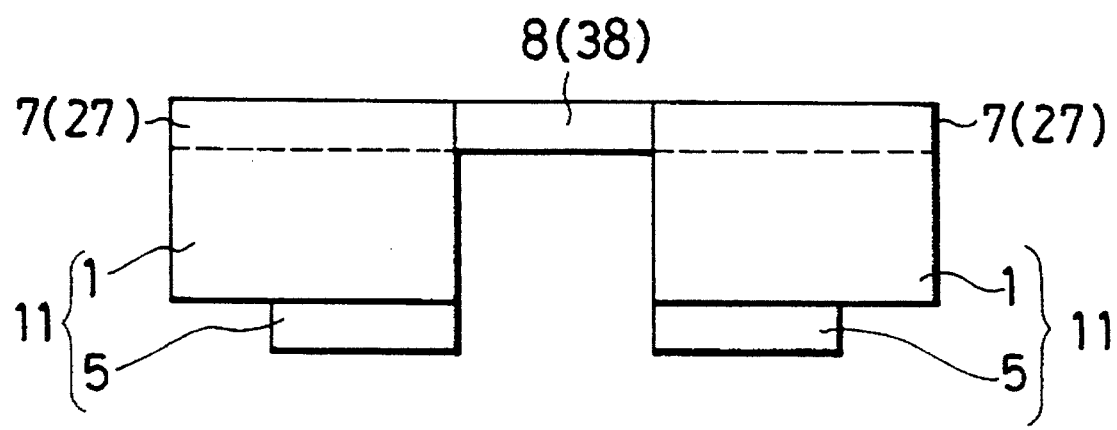
FIG. 14 shows in two different views still another preferred embodiment of optical external modulator according to the invention and comprising an optical waveguide as an optical transmission line, a thin filmlike piezoelectric device as stress application means and a polarization maintaining fiber as optical modulation means, wherein (a) represents a side view and (b) represents a plan view.
Figure 14B:
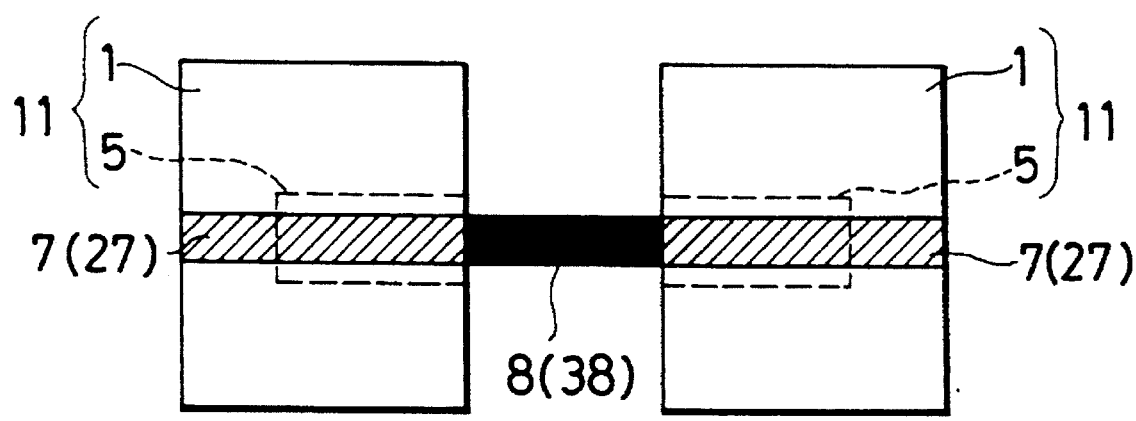

FIG. 14 shows a twelfth embodiment of optical external modulator according to the invention. This embodiment comprises a pair of square quartz glass substrate 1 each of which is about 1 mm thick and 20 mm wide, a pair of thin filmlike piezoelectric devices 5, 5 respectively arranged on surfaces of the square quartz glass substrates 1 and a pair of optical waveguides 27, 27 which are about 10 μm wide and 5 μm thick and respectively arranged on the surfaces of the substrates 1, 1 opposite to the ones where the thin filmlike piezoelectric devices 5, 5 are arranged o produce a pair of polarization modulators 11, 11, between which a polarization maintaining fiber 38 is inserted. The polarization maintaining fibre 38 is so arranged that its principal axis is inclined by 45 degrees relative to the direction along which stress is applied to he optical waveguides 27, 27.

Embodiment 13

Figure 15A:
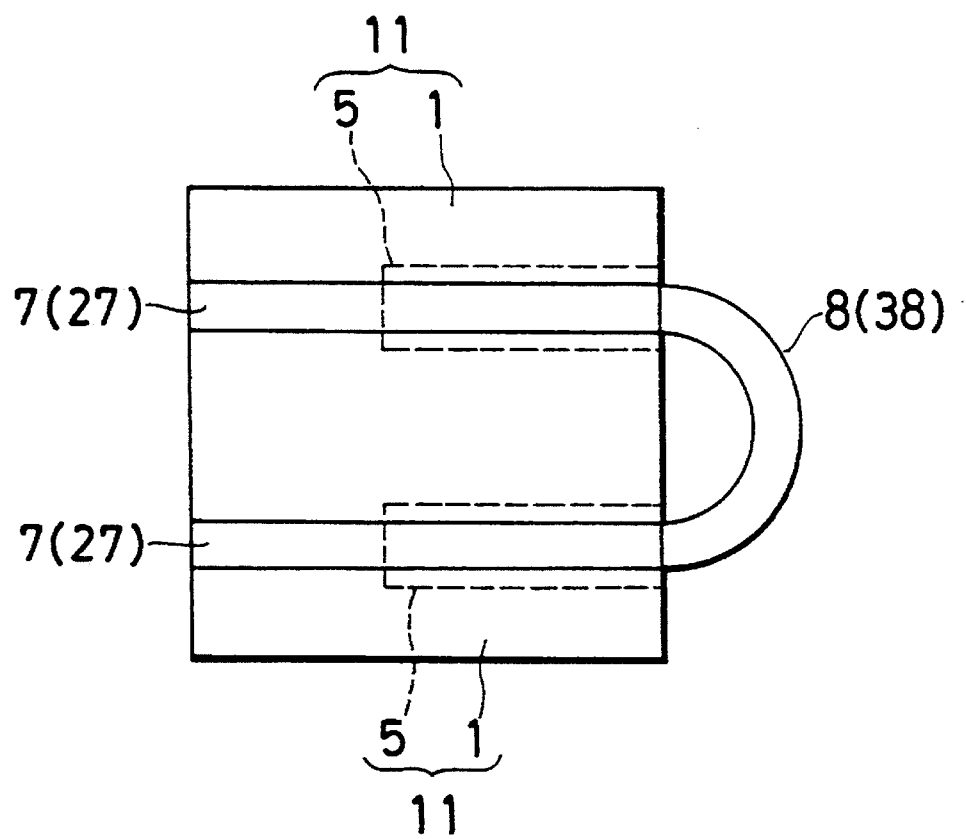
FIG. 15 shows in two different views still another preferred embodiment of optical external modulator according to the invention and comprising a pair of optical waveguides as an optical transmission line, a thin filmlike piezoelectric device as stress application means and a polarization maintaining fiber as optical modulation means, wherein (a) represents a plan view and (b) represents a side view.
Figure 15B:
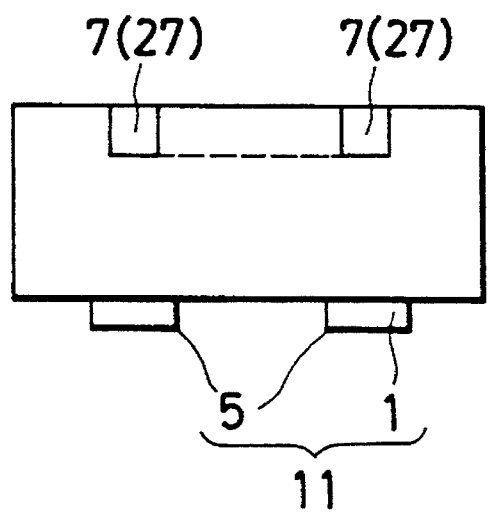

FIG. 15 shows a thirteenth embodiment of optical external modulator according to the invention. This embodiment comprises a substrate 1, a pair of thin filmlike piezoelectric devices 5, 5 arranged in parallel with each other on a surface of the substrate 1 and a pair of optical waveguides 27, 27 right above the respective thin filmlike piezoelectric devices 5, on the surface of the substrate 1 opposite to the one where the thin filmlike piezoelectric devices 5, 5 are arranged, said optical waveguides 27, 27 operating as optical transmission lines 7, 7, and a semicircular polarization maintaining optical fiber 38 disposed between the optical waveguides 27, 27 to connect them.

Embodiment 14

Figure 16A:
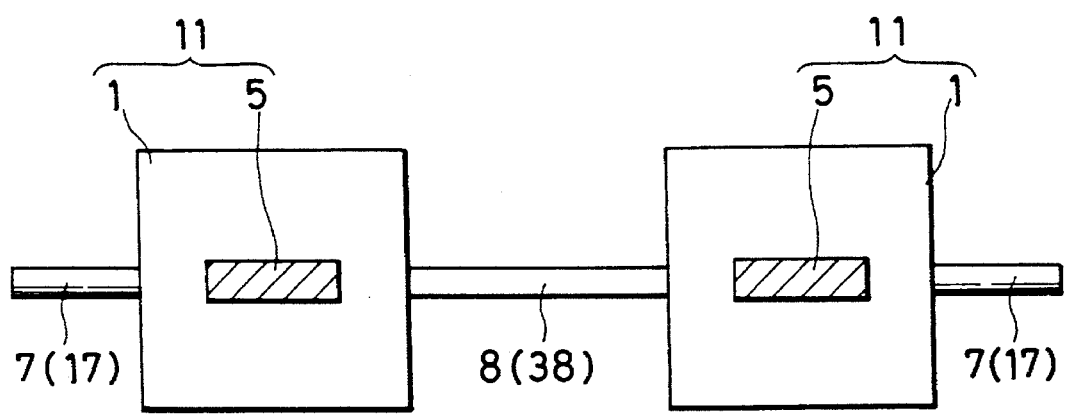
FIG. 16 shows in two different views still another preferred embodiment of optical external modulator according to the invention and comprising a single mode optical fiber as an optical transmission line, a thin filmlike piezoelectric device as stress application means and a polarization maintaining fiber as optical modulation means, the thin filmlike piezoelectric device being disposed on the single mode optical fiber, wherein (a) represents a plan view and (b) represents a side view.
Figure 16B:
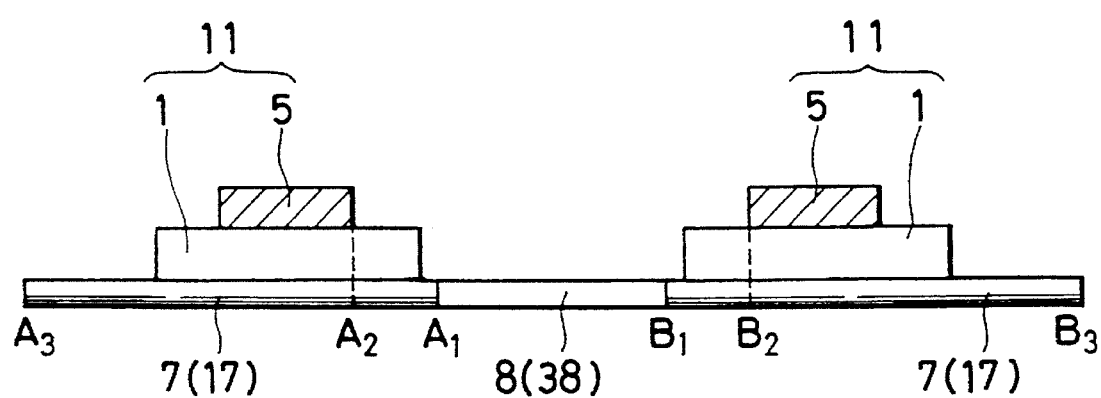

FIG. 16 shows a fourteenth embodiment of optical external modulator according to the invention. The basic configuration of the embodiment is similar to that of the embodiment of FIG. 14 and this embodiment differs from the twelfth embodiment only in that a pair of single mode optical fibers 17, 17 are arranged to operate as optical transmission lines 7, 7. The single mode optical fibers 17, 17 are arranged on the substrate 1 as shown in (b) of FIG. 16 and covered by respective pieces of a sheath (not shown) formed by burning granulous quartz glass (and having a specific acoustic impedance close to that of the clads of the single mode optical fibers 17, 17) and acoustically secured to the substrate 1.

Embodiment 15

Figure 17A:
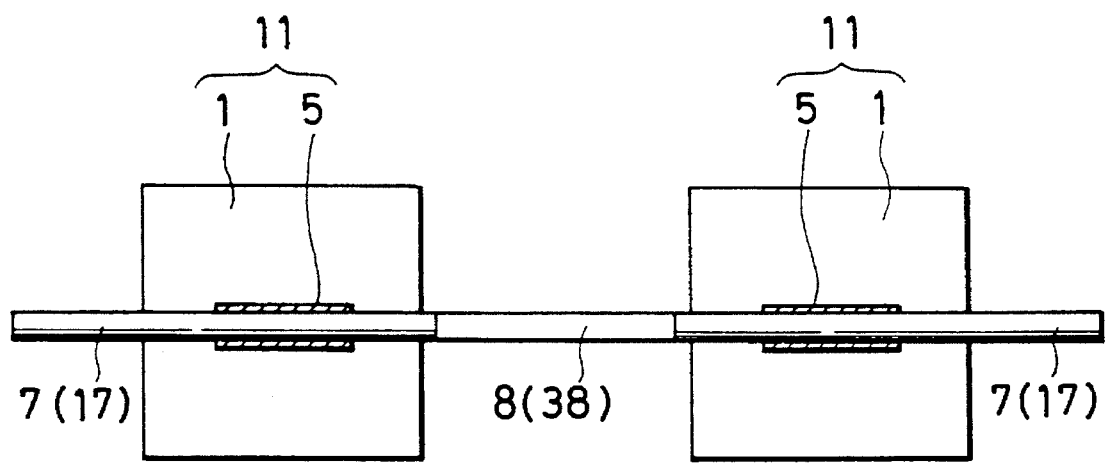
FIG. 17 shows in two different views still another preferred embodiment of optical external modulator according to the invention and comprising a single mode optical fiber as an optical transmission line, a thin filmlike piezoelectric device as stress application means and a polarization maintaining fiber as optical modulation means, the single mode optical fiber being disposed on the thin filmlike piezoelectric device, wherein (a) represents a plan view and (b) represents a side view.
Figure 17B:
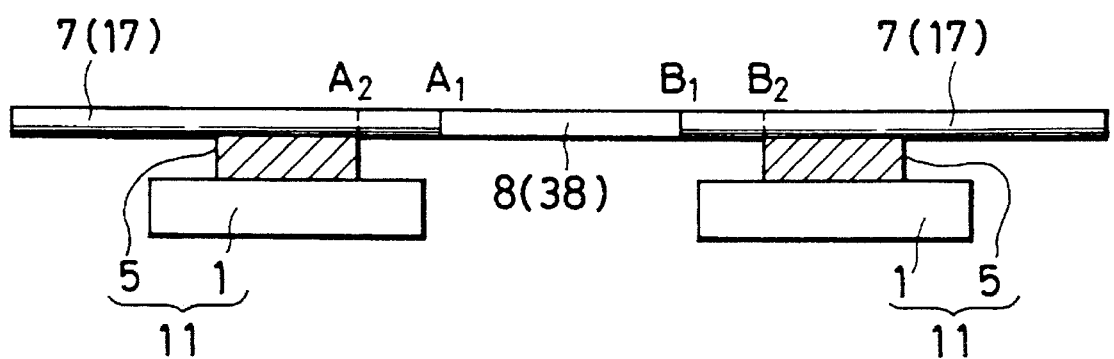

FIG. 17 shows a fifteenth embodiment of optical external modulator according to the invention. The basic configuration of the embodiment is similar to that of the embodiment of FIG. 16 and this embodiment differs from the fourteenth embodiment only in that a pair of single mode optical fibers 17, 17 are arranged right on the respective thin filmlike piezoelectric devices 5, 5, which are connected by a polarization maintaining fiber 38.

Embodiment 16

Figure 18:
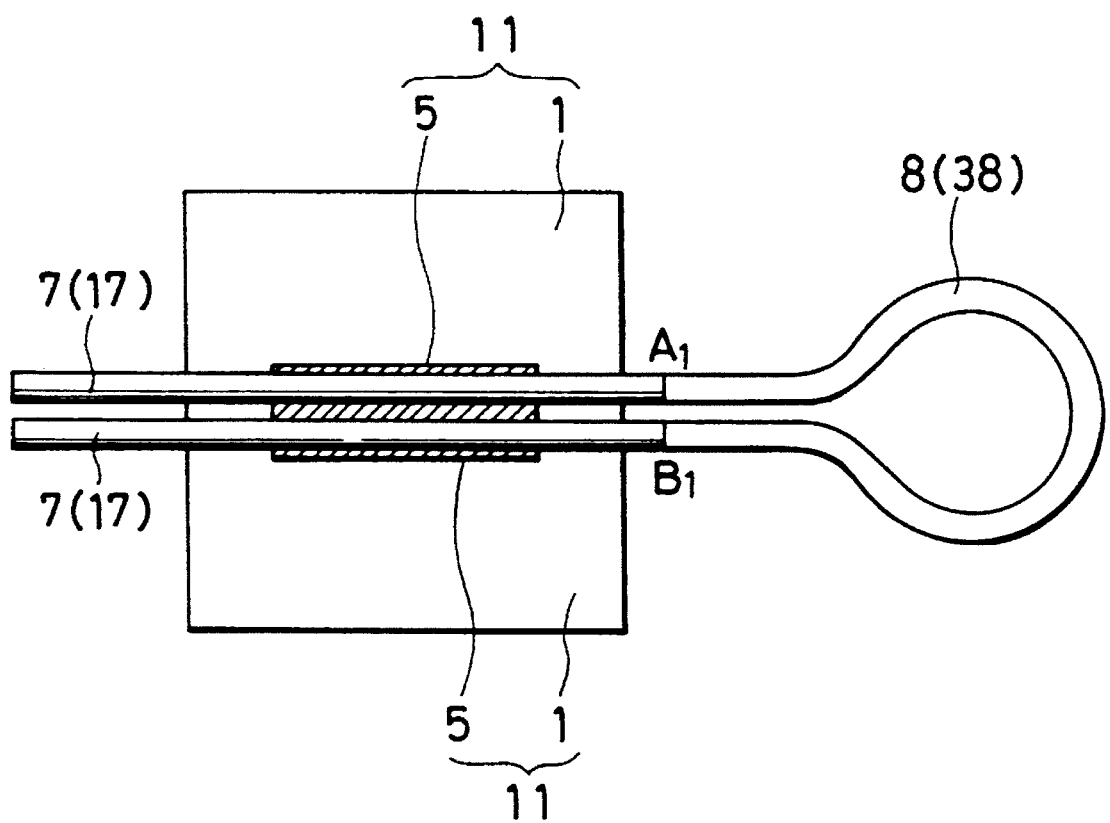
FIG. 18 shows still another preferred embodiment of optical external modulator according to the invention and comprising a pair of single mode optical fibers arranged in parallel on a single thin filmlike piezoelectric device to be used as stress application means and a looped polarization maintaining fiber as optical modulation means.

FIG. 18 shows a sixteenth embodiment of optical external modulator according to the invention. This embodiment comprises a substrate 1, a thin filmlike piezoelectric device 5 arranged on a surface of the substrate 1 and a pair of single mode optical fibers 17, 17 arranged in parallel with each other right on the thin filmlike piezoelectric device 5 and covered a sheath (not shown) which is formed by burning granulous quartz glass (and having a specific acoustic impedance close to that of the clads of the single mode Optical fibers 17, 17) and acoustically secured to the substrate 1, said pair of single mode optical fibers 17, 17 being connected by a ring-shaded polarization maintaining fiber 38.

Embodiment 17

Figure 19A:
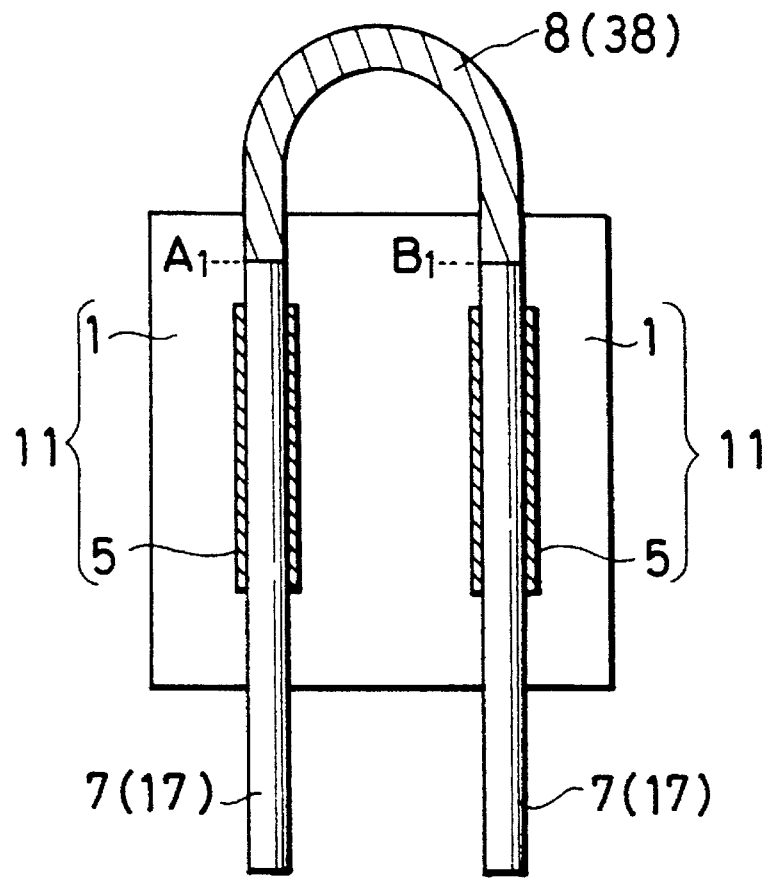
FIG. 19 shows in two different views another preferred embodiment of optical external modulator according to the invention and comprising a pair of single mode optical fibers arranged on respective thin filmlike piezoelectric devices disposed on a single substrate as stress application means and a looped polarization maintaining fiber as optical modulation means, wherein (a) represents a plan view and (b) represents a front view.
Figure 19B:
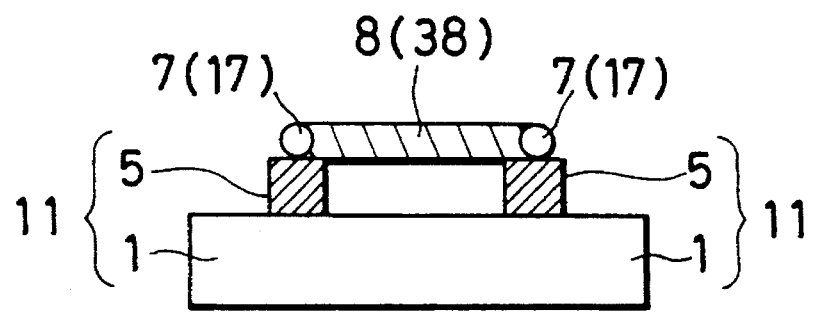

FIG. 19 shows a seventeenth embodiment of optical external modulator according to the invention. This embodiment comprises a substrate 1, a pair of thin filmlike piezoelectric devices 5, 5 arranged on a surface of the substrate 1 in parallel with each other with a given distance separating them and a pair of single mode optical fibers 17, 17 arranged right on the respective thin filmlike piezoelectric devices 5, 5, said pair of single mode optical fibers 17, 17 being connected by a U-shaped polarization maintaining fiber 38.

Embodiment 18

Figure 20A:
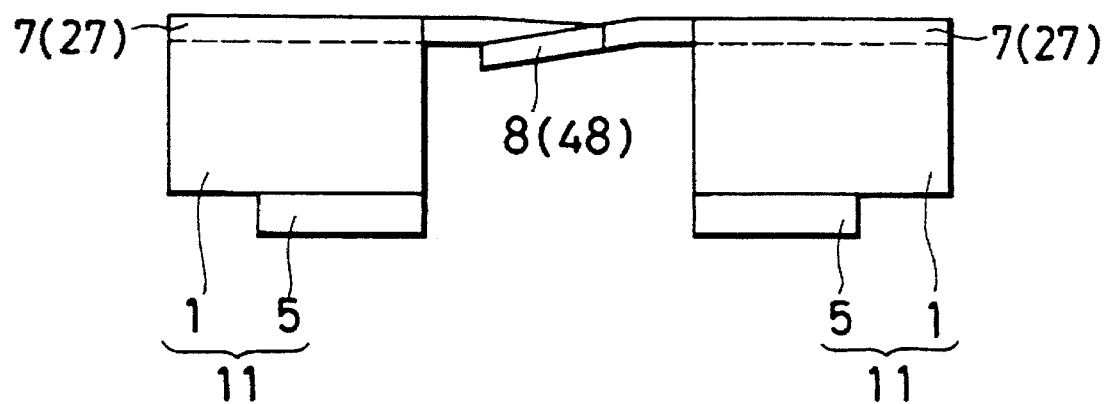
FIG. 20 shows in two different views still another preferred embodiment of optical external modulator according to the invention and comprising an optical waveguide as an optical transmission line, a thin filmlike piezoelectric device as stress application means and a looped single mode optical fiber as optical modulation means, wherein (a) represents a side view and (b) represents a plan view.
Figure 20B:
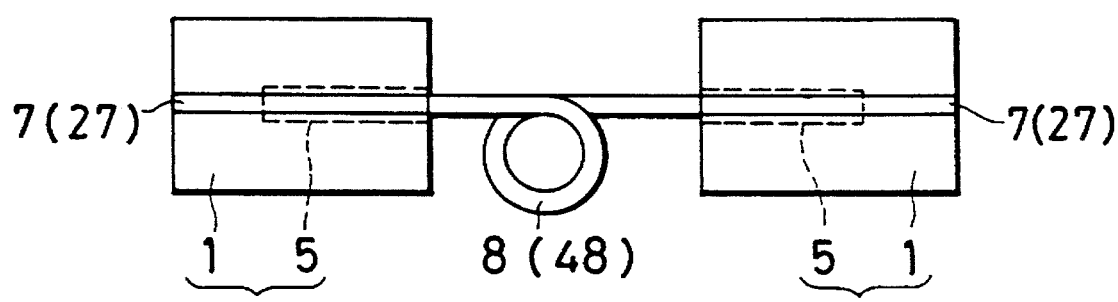

FIG. 20 shows an eighteenth embodiment of optical external modulator according to the invention. This embodiment comprises a pair of square quartz glass substrate 1 each of which is about 1 mm thick and 20 mm wide, a pair of thin filmlike piezoelectric devices 5, 5 respectively arranged on surfaces of the square quartz glass substrates 1 and a pair of optical waveguides 7, 7 which are about 10 μm wide and 5 μm thick and respectively arranged on the surfaces of the substrates 1, 1 opposite to the ones where the thin filmlike piezoelectric devices 5, 5 are arranged to produce a pair of polarization modulators 11, 11, which are connected with each other by a looped single mode optical fiber 48 having a radius of curvature that produces a phase difference of $(2m-1)*\pi/2$ (m is a positive integer) between the two components of light being propagated through the single mode optical fiber 48.

Embodiment 19

Figure 21A:
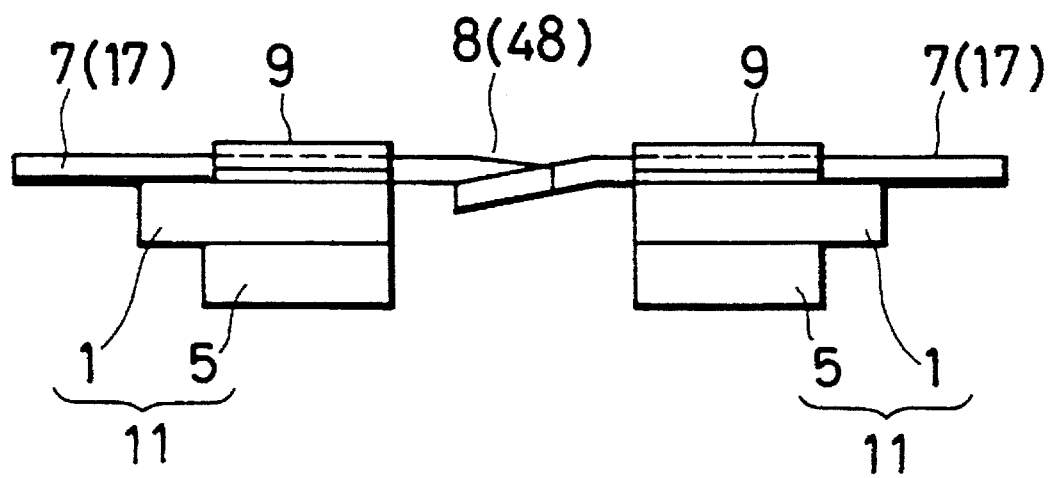
FIG. 21 shows in two different views still another preferred embodiment of optical external modulator according to the invention and comprising a single mode optical fiber as an optical transmission line, a thin filmlike piezoelectric device as stress application means and a looped single mode optical fiber as optical modulation means, wherein (a) represents a side view and (b) represents a plan view.
Figure 21B:
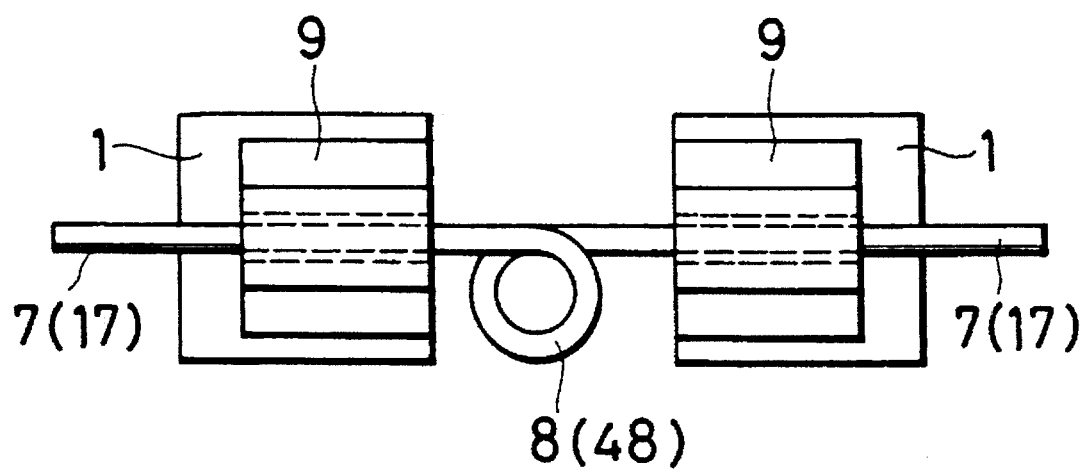

FIG. 21 shows a nineteenth embodiment of optical external modulator according to the invention. The basic configuration of the embodiment is similar to that of the embodiment of FIG. 20 and this embodiment differs from the eighteenth embodiment only in that a pair of single mode optical fibers 17, 17 are arranged as optical transmission lines. The single mode optical fibers 17, 17 are disposed on the respective substrates 1, 1 as shown in (b) of FIG. 21 and covered by respective pieces of a sheath 9 (not shown) formed by burning granulous quartz glass (and having a specific acoustic impedance close to that of the clads of the single mode optical fibers 17, 17) and acoustically secured to the substrate 1.

Embodiment 20

Figure 22:
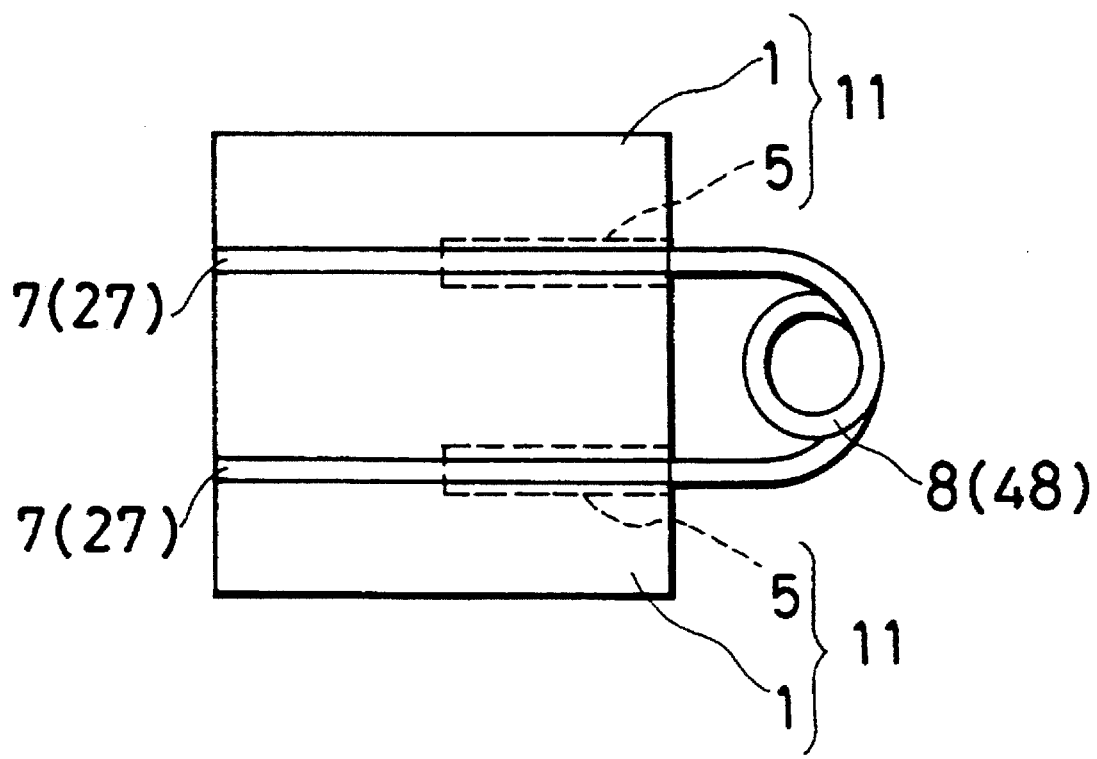
FIG. 22 shows still another preferred embodiment of optical external modulator according to the invention and comprising a pair of optical waveguides as an optical transmission line, a thin filmlike piezoelectric device as stress application means and a looped single mode optical fiber as optical modulation means.

FIG. 22 shows a twentieth embodiment of optical external modulator according to the invention. In this embodiment, a pair of optical waveguides 7, 7 are arranged on a substrate 1 and connected by a looped single mode optical fiber 48 having a radius of curvature that produces a phase difference of $(2m-1)*\pi/2$ (m is a positive integer) between the X- and Y-components of light being propagated through the optical waveguides 7, 7.

Evaluation of an Optical External Modulator According to the Invention

Figure 28:
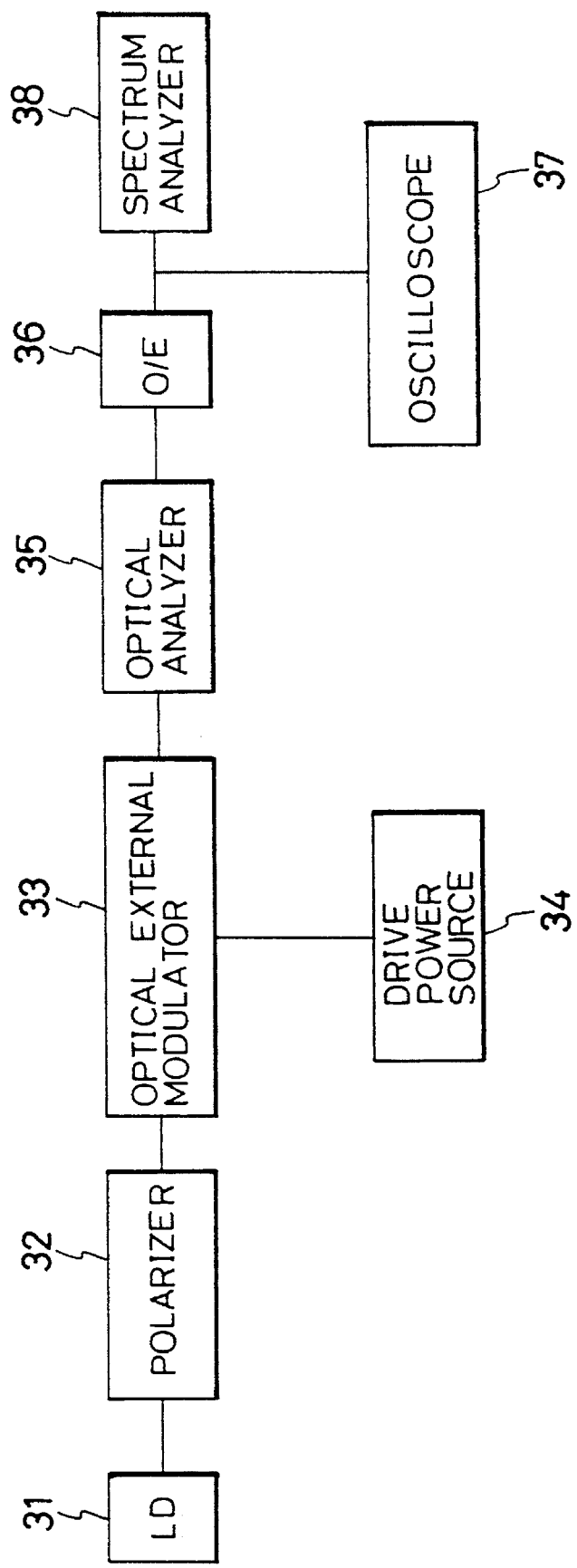
FIG. 28 is a schematic illustration of a gauging system to be used for conventional optical external modulators.

An optical external modulator according to the invention and comprising a polarization maintaining optical fiber 38 that operates as a phase changing section 8 for producing a phase difference of $(2m-1)*\pi/2$ (m is a positive integer) between the two components of light being propagated therethrough was prepared and tested by means of a gauging system as illustrated in FIG. 28. The light source 31 was a laserdiode having a wavelength of 1.55 μm and the drive power source 34 had a drive frequency of 176 MHz and a power output of 10 dBm, while the polarization maintaining optical fiber 38 had a refractivity index of 1.5 along the principal axis, a difference in the refractivity index of $3*10^{-4}$ and a length of 69.75 mm. The modulated output of the optical external modulator was observed by means of a spectrum analyzer while modifying the state of polarization of incident light by operating a polarizer 32 arranged immediately upstream relative to the optical external modulator. While a conventional optical external modulator showed a difference of greater than 20 dB in the modulation output between the best and worst values, the corresponding difference of the optical external modulator according to the invention was less than 3 dB. This fact proves that an optical external modulator according to the invention can effectively modulate the polarization without regulating the state of polarization of incident light.

The Operation of an Optical External Modulator Comprising a Quarter-Wavelength Plate Of the above described embodiments, each of those comprising a quarter-wavelength plate 28 operates in a manner as described below by referring to FIG. 23. Note that the optical external modulator illustrated in FIG. 23 has a configuration similar to that of the embodiment of FIG. 5, although the sheath of FIG. 5 is not shown in FIG. 23. The light passing through the optical external modulator of FIG. 23 is modulated in the following way.

Figure 23:
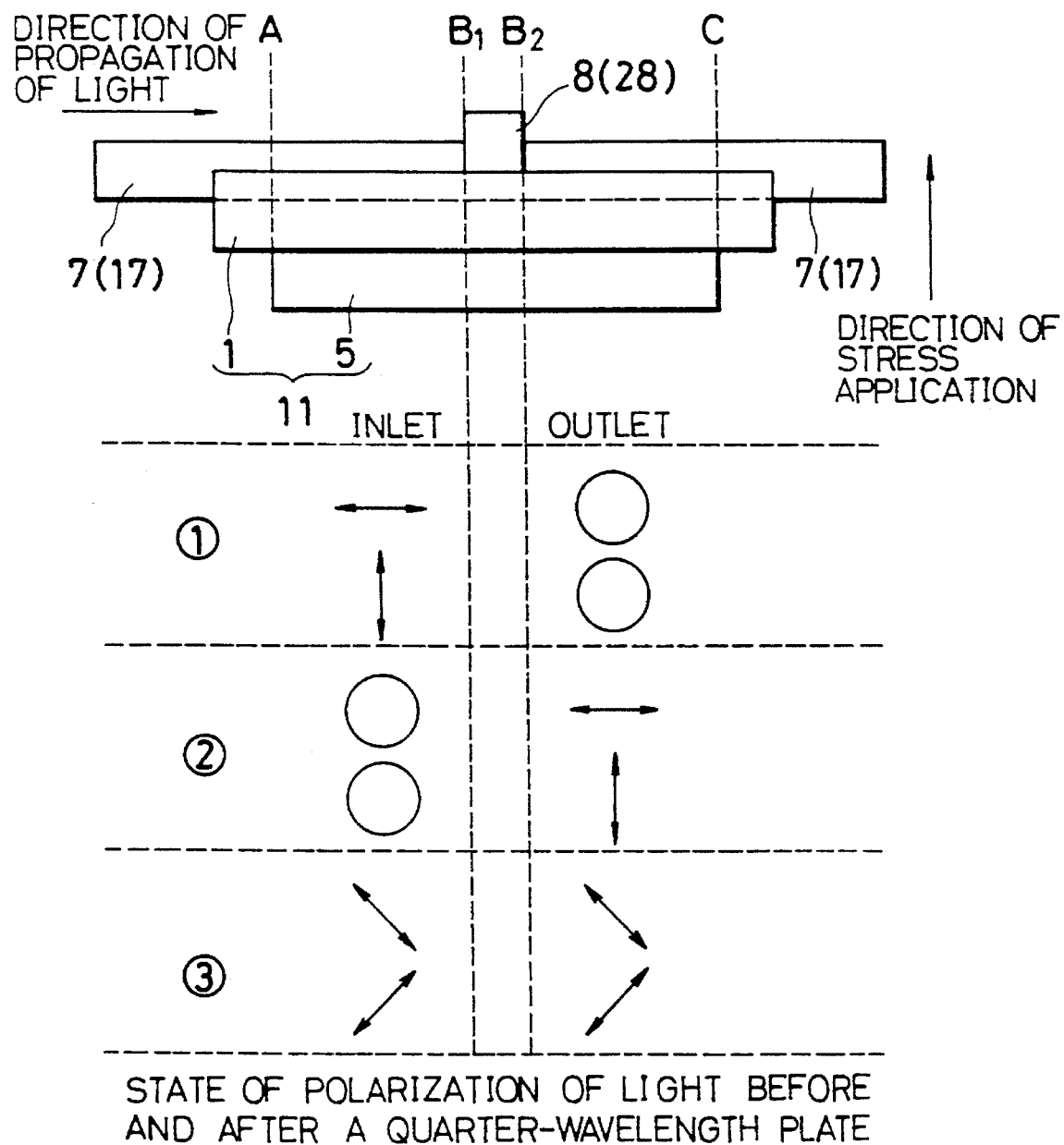
FIG. 23 is a schematic illustration, showing the state of polarization of light before and after it passes the quarter-wavelength plate comprised in an optical external modulator according to the invention.

If a linearly polarized wave of light having an axis of polarization that is parallel or vertical to the direction along which stress as shown in (1) of FIG. 23 is applied to the optical transmission line 7 enters section A–B$_1$ of FIG. 23, the state of polarization of the wave is modified as the wave proceeds through the quarter-wavelength plate 28 to produce a circularly polarized wave as illustrated in (1) of FIG. 23 in section B$_2$–C.

If, on the other hand, a circularly polarized wave of light as illustrated in (2) of FIG. 23 is introduced into section A–B$_1$ of FIG. 23, the state of polarization of the wave is modified as the wave proceeds through the quarter-wavelength plate 28 to produce a linearly polarized wave having an axis of polarization that is parallel or vertical to the direction along which stress is applied to the optical transmission line 7 as shown in (2) of FIG. 23 in section B$_2$–C.

If a linearly polarized wave of light having an axis of polarization that is parallel or vertical to the principal axis of the quarter-wavelength plate 28 as shown in (3) of FIG. 23 enters section A–B$_1$ of FIG. 23, the state of polarization of the wave is preserved as the wave proceeds through the quarter-wavelength plate 28 to produce a linearly polarized wave having an axis of polarization that is parallel or vertical to the principal axis of the quarter-wavelength plate 28 as shown in (3) of FIG. 23 in section B$_2$–C.

If, finally, a light wave that is polarized otherwise enters section A–B$_1$ of FIG. 23, the state of polarization of the wave is either linear and different from any of the above described states or elliptic in sections A–B$_1$ and B$_2$–C.

Of all possible states of polarization, those where incident light is linearly polarized and has an axis of polarization that is parallel with or vertical to the direction along which stress is applied to the optical transmission line 7 are free from modulation of the polarization. However, with an optical external modulator according to the invention and comprising a quarter-wavelength plate 28, light entering the modulator would never be modulated to show a linearly polarized state with an axis of polarization that is horizontal to or vertical with the direction along which stress is applied to the optical transmission line in sections A–B$_1$ and B$_2$–C of FIG. 23 regardless of the state of polarization of the incident light. Thus, with such an optical external modulator, incident light in any state of polarization comes to be modulated for the polarization without fail so that the modulator effectively and efficiently operates for modulation of the polarization without requiring regulation of the state o polarization of incident light.

Figures 24A, 24B, 24C:
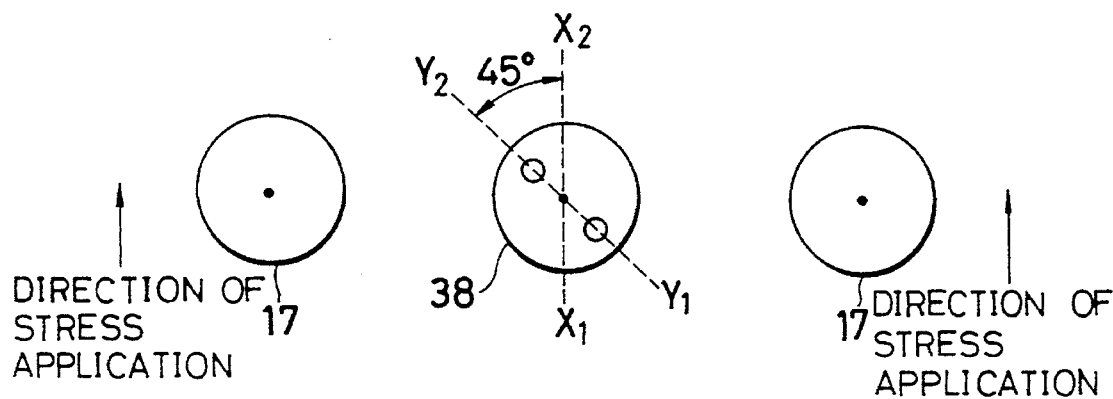
FIG. 24 shows the positional relationship between the polarization maintaining fiber comprised in an optical external modulator according to the invention and the direction along which stress is applied, wherein (a) represents a front view of the single mode optical fibers disposed to the left of the polarization maintaining optical fiber in FIG. 16, (b) represents a front view of the polarization maintaining optical fiber where the principal axis $Y_1$–$Y_2$ of the optical fiber is inclined by 45 degrees from the direction of stress application and (c) represents a front view of the single mode optical fibers disposed to the right of the polarization maintaining optical fiber in FIG. 16.
Figure 25:
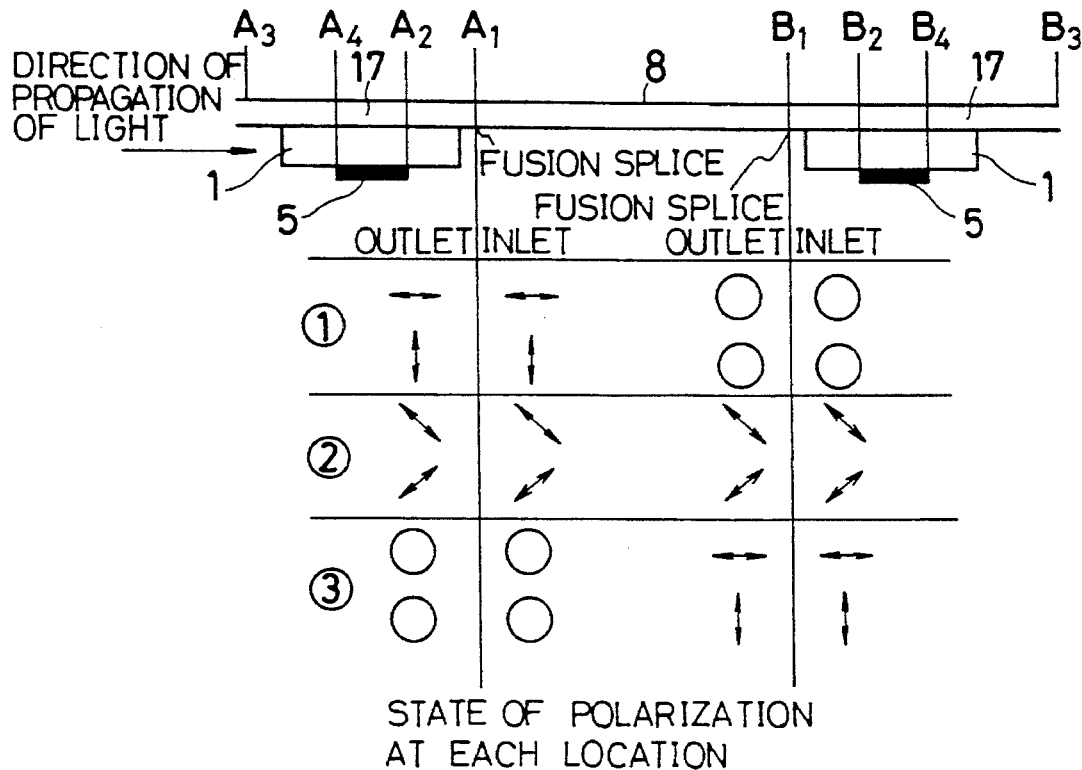
FIG. 25 is a schematic illustration, showing the state of polarization of light before and after it passes the polarization maintaining optical fiber comprised in an optical external modulator according to the invention.

The Operation of an Optical External Modulator Comprising a Polarization Maintaining Fiber Of the above described embodiments, each of those comprising a polarization maintaining fiber 38 operates in a manner as described below by referring to FIGS. 24 and 25. Note that the optical external modulator illustrated in FIG. 25 has a configuration similar to that of the embodiment of FIG. 16, although the sheath of FIG. 16 is not shown in FIG. 25. The single mode optical fiber 17 and the polarization maintaining fiber 38 of FIG. 25 are connected without loss by means of a fusion splicer. Note that the principal axis Y$_1$–Y$_2$ and the direction X$_1$–X$_2$ along which stress is applied to the single mode optical fiber 17 are inclined from each other by an angle of 45 degrees.

The length of section A$_1$–B of the polarization maintaining fiber 38 is determined by the formula below so that the phase difference of the X- and Y-components of light contained in the fiber is held equal to $(2m-1)*\pi/2$ (m is a positive integer).

$$A_1-B=(2m-1)*(\lambda/4)/(\Delta n),$$

where m: a positive integer,

λ: the wavelength of light from the light source and

Δn: the difference in the refractive index in the polarization maintaining fiber.

The light passing through the optical external modulator is modulated in the following way. If a linearly polarized wave of light having an axis of polarization that is parallel or vertical to the direction along which stress as shown in (1) of FIG. 25 is applied to the optical transmission line 7 enters section A$_2$–A$_1$ of FIG. 25 the state of polarization of the wave is modified as the wave proceeds through the polarization maintaining fiber 38 to produce a circularly polarized wave in section B$_2$–B$_4$.

If a linearly polarized wave of light having an axis of polarization that is parallel or vertical to the principal axis Y$_1$–Y$_2$ of the polarization maintaining fiber 38 ((2) of FIG. 25) enters section A$_4$–A$_2$ of FIG. 29, the state of polarization of the wave is preserved as the wave proceeds through the polarization maintaining fiber 38 to produce a linearly polarized wave having an axis of polarization that is parallel or vertical to the principal axis Y$_1$–Y$_2$ of the polarization maintaining fiber 38 in section B$_2$–B$_4$.

If, on the other hand, a circularly polarized wave of light as illustrated in (3) of FIG. 25 is introduced into section A$_4$–A$_2$ of FIG. 25, the state of polarization of the wave is modified as the wave proceeds through the polarization maintaining fiber 38 to produce a linearly polarized wave having an axis of polarization that is parallel or vertical to the direction along which stress is applied to the optical transmission line 7 as shown in (3) of FIG. 25 in section B$_2$–B$_4$.

For incident light in any other state of polarization, the state of polarization of the light is either linear and different from any of the above described states or elliptic in sections A$_4$–A$_2$ and B$_2$–B$_4$.

Of all possible states of polarization, those where incident light is linearly polarized and has an axis of polarization that is parallel with or vertical to the direction along which stress is applied to the optical transmission line 7 are free from modulation of the polarization. However, with an optical external modulator according to the invention, light entering the modulator would never be modulated to show a linearly polarized state with an axis of polarization that is horizontal to or vertical with the direction along which stress is applied to the optical transmission line in sections A$_4$–A$_2$ and B$_2$–B$_4$ regardless of the state of polarization of the incident light. Thus with such an optical external modulator, incident light in any state of polarization comes to be modulated for the polarization without fail so that the modulator effectively and efficiently operates for modulation of the polarization without requiring regulation of the state of polarization of incident light.

The Operation of an Optical External Modulator Comprising an Anisotropic Waveguide in the Phase Changing Section The operation of such an optical external modulator is same as that of an optical external modulator comprising a quarter-wavelength plate in the phase changing section.

The Operation of an Optical External Modulator Comprising Electrodes in the Phase Changing Section The operation of such an optical external modulator is same as that of an optical external modulator comprising a quarter-wavelength plate in the phase changing section.

The Operation of an Optical External Modulator Comprising a Looped Single Mode Optical Fiber in the Phase Changing Section Again, the operation of such an optical external modulator is same as that of an optical external modulator comprising a quarter-wavelength plate in the phase changing section.

Advantages of the Invention

As described above in detail, with an optical external modulator according to the invention, incident light in any state of polarization comes to be modulated for the polarization without fail so that, unlike conventional modulators, the modulator effectively and efficiently operates for modulation of polarization without requiring regulation of the state of polarization of incident light, reducing the use of a polarizer arranged immediately upstream relative to the modulator needless to simplify the operation of modulation.

What is claimed is:

1. An optical external modulator characterized in that it comprises a substrate (1), an optical transmission line (7), a phase changing section (8) and a polarization modulating section (11) for changing the state of polarization of the light being propagated through the optical transmission line (7) by applying a stress to the optical transmission line (7) as a function of a modulation signal given thereto and the phase changing section (8) for changing the phase difference between the X-component and the Y-component of the light being propagated through the optical transmission line (7) by $(2m-1)*\pi/2$ (m is a positive integer).

2. An optical external modulator according to claim 1, characterized in that the optional transmission line (7) has a slit (37) formed therein and the phase changing section (8) is inserted into and rigidly secured to the slit (37) for changing the phase difference between the X-component and the Y-component of the light being propagated through the optical transmission line (7) by $(2m-1)*\pi/2$ (m is a positive integer).

3. An optical external modulator characterized in that it comprises a substrate (1), a pair of optical transmission lines (7, 7), a phase changing section (8) and a polarization modulating section (11) for changing the state of polarization of the light being propagated through the pair of optical transmission lines (7, 7) by applying a stress to the optical transmission lines (7, 7) as a function of a modulation signal given thereto, the phase changing section (8) being arranged between the pair of optical transmission lines (7, 7) for changing the phase difference between the X-component and the Y-component of the light being propagated through the optical transmission lines (7, 7) by $(2m-1)*\pi/2$ (m is a positive integer).

4. An optical external modulator characterized in that it comprises a substrate (1), pair of optical transmission lines (7, 7), a phase changing section (8) a pair of polarization modulating sections (11, 11) for changing the state of polarization of the light being propagated through respective optical transmission lines (7, 7) arranged respectively as integral parts thereof by applying a stress to the optical transmission lines (7, 7) as a function of a modulation signal given thereto and a phase changing section (8) arranged between the pair of optical transmission lines (7, 7) for changing the phase difference between the X-component and the Y-component of the light being propagated through the optical transmission lines (7, 7) by $(2m-1)*\pi/2$ (m is a positive integer).

5. An optical external modulator according to claim 1, characterized in that the polarization modulating section (11) includes a bulk type piezoelectric device (60) formed by arranging lower and upper electrodes on a piezoelectric substrate, the optical transmission lines (7) being arranged on a side of the bulk type piezoelectric device (60) such that the state of polarization of the light being propagated through the optical transmission line (7) is changed by driving the piezoelectric substrate and applying a stress to the optical transmission line (7) as a function of a modulation signal given thereto.

6. An optical external modulator according to claim 1, characterized in that the polarization modulating section (11) or each of the polarization modulating sections (11, 11) includes an lower electrode (2), a piezoelectric film (3) and an upper electrode (4) sequentially arranged on the top or bottom side of the substrate (1) to produce a thin filmlike piezoelectric device (5) having a multilayer structure and an optical transmission line (7) arranged on the top or bottom side of the substrate (1) and above or below said thin filmlike piezoelectric device (5) such that the state of polarization of the light being propagated through the optical transmission line (7) is changed by driving the piezoelectric substrate and applying a stress to the optical transmission line (7) as a function of a modulation signal given to the appropriate one of the electrodes (2) and (4).

7. An optical external modulator according to claim 6, characterized in that a pair of thin filmlike piezoelectric devices (5, 5) are arranged on the common substrate (1) in place of the single thin filmlike piezoelectric device (5) and a pair of optical transmission lines (7, 7) are disposed on or under and rigidly secured to the respective thin filmlike piezoelectric devices (5, 5) in place of the single optical transmission line (7), the phase changing section (8) being disposed between the optical transmission lines (7, 7) for changing the phase difference between the X-component and the Y-component of the light being propagated through the optical transmission lines (7, 7) by $(2m-1)*\pi/2$ (m is a positive integer).

8. An optical external modulator according to claim 6, characterized in that the pair of thin filmlike piezoelectric devices (5, 5) arranged on respective substrates (1, 1) in place of the common substrate (1), the pair of optical transmission lines (7, 7) being arranged on or under and rigidly secured to the respective thin filmlike piezoelectric devices (5, 5), the phase changing section (8) disposed between the optical transmission lines (7, 7) for changing the phase difference between the X-component and the Y-component of the light being propagated through the optical transmission lines (7, 7) by $(2m-1)*\pi/2$ (m is a positive integer).

9. An optical external modulator according to claim 1, characterized in that it comprises a quarter-wavelength plate (28) for the phase changing section (8), the principal axis of said quarter-wavelength plate (28) being held angularly relative to the direction of application of stress to the optical transmission line (7) or lines (7, 7) by the thin filmlike piezoelectric device (5) or devices (5, 5) to form an angle of 45 degrees.

10. An optical external modulator according to claim 1, characterized in that it comprises an anisotropic optical waveguide (18) for the phase changing section (8), the principal axis of said anisotropic optical waveguide (18) being held angularly relative to the direction of application of stress to the optical transmission line (7) or lines (7, 7) by the thin filmlike piezoelectric device (5) or devices (5, 5) to form an angle of 45 degrees, the length of said anisotropic optical waveguide (18) being so selected as to change the phase difference between the X-component and the Y-component of the light being propagated therethrough by $(2m-1)*\pi/2$ (m is a positive integer).

11. An optical external modulator according to claim 1, characterized in that it comprises a polarization maintaining optical fiber (38) for the phase changing section (8), the principal axis of said polarization maintaining optical fiber (38) being held angularly relative to the direction of application of stress to the optical transmission line (7) or lines (7, 7) to form an angle of 45 degrees, the length of said polarization maintaining optical fiber (38) being so selected as to change the phase difference between the X-component and the Y-component of the light being held therein by $(2m-1)*\pi/2$ (m is a positive integer).

12. An optical external modulator according to claim 1, characterized in that it comprises a pair of electrodes (70, 70) arranged at opposite sides of the optical transmission line (7) or lines (7, 7), the length of said electrodes (70) being so selected as to change the phase difference between the X-component and the Y-component of the light being held therein by $(2m-1)*\pi/2$ (m is a positive integer).

13. An optical external modulator according to claim 1, characterized in that it comprises a single mode optical fiber (48) having a looped configuration for the phase changing section (8), radius of curvature of said single mode optical fiber (48) being so selected as to change the phase difference between the X-component and the Y-component of the light being propagated therethrough by $(2m-1)*\pi/2$ (m is a positive integer).

14. An optical external modulator according to claim 1, characterized in that it comprises a single mode optical fiber (17) or a pair of single mode optical fibers (17, 17) for the optical transmission line (7) or the optical transmission lines (7, 7) whichever is appropriate.

15. An optical external modulator according to claim 1, characterized in that it comprises an optical waveguide (27) or a pair of optical waveguides (27, 27) for the optical transmission line (7) or the optical transmission lines (7, 7) whichever is appropriate.

* * * * *